(12) United States Patent
Okegawa et al.

(10) Patent No.: US 9,225,966 B2
(45) Date of Patent: Dec. 29, 2015

(54) IMAGING APPARATUS, CONTROLLING METHOD THEREOF, AND PROGRAM

(75) Inventors: Shuji Okegawa, Chiba (JP); Hirokazu Nakaya, Saitama (JP); Takahiro Tokuda, Tokyo (JP)

(73) Assignee: Sony Corporation (JP)

( * ) Notice: Subject to any disclaimer, the term of this patent is extended or adjusted under 35 U.S.C. 154(b) by 963 days.

(21) Appl. No.: 13/314,702

(22) Filed: Dec. 8, 2011

(65) Prior Publication Data

US 2012/0162393 A1 Jun. 28, 2012

(30) Foreign Application Priority Data

Dec. 22, 2010 (JP) ................. P2010-286199

(51) Int. Cl.
*G03B 17/00* (2006.01)
*H04N 13/02* (2006.01)
*H04N 5/232* (2006.01)

(52) U.S. Cl.
CPC ....... *H04N 13/0239* (2013.01); *H04N 5/23209* (2013.01); *H04N 5/23238* (2013.01); *H04N 5/23245* (2013.01); *H04N 13/025* (2013.01)

(58) Field of Classification Search
CPC ........................... G03B 17/14; G03B 15/0468
USPC ............................................................ 348/50
See application file for complete search history.

(56) References Cited

U.S. PATENT DOCUMENTS

2003/0174229 A1* 9/2003 Kubota .......................... 348/335
2005/0174427 A1* 8/2005 Yoshida ........................... 348/55

FOREIGN PATENT DOCUMENTS

| CN | 2870324 Y | 2/2007 |
|---|---|---|
| JP | 2000-261829 A | 9/2000 |
| JP | 2002014405 A | 1/2002 |
| JP | 2002330450 A | 11/2002 |
| JP | 2003333582 A | 11/2003 |
| JP | 2004120527 A | 4/2004 |
| JP | 2004254139 A | 9/2004 |

(Continued)

OTHER PUBLICATIONS

Office Action from Japanese Application No. 2010-286199, dated Apr. 1, 2014.

(Continued)

*Primary Examiner* — Sath V Perungavoor
*Assistant Examiner* — Jeffery Williams
(74) *Attorney, Agent, or Firm* — Lerner, David, Littenberg, Krumholz & Mentlik, LLP

(57) ABSTRACT

An imaging apparatus includes an imaging unit generating a plane image including a subject by imaging the subject in a specific direction or a stereoscopic image for stereoscopically viewing the subject; an adapter mounting detection unit detecting whether an adapter, which includes an omnidirectional imaging optical system imaging the subject in all directions, is mounted on the imaging unit; an image capture mode setting unit setting, based on a user operation, an omnidirectional image capture mode of recording the plane image including the subject in all directions in a state where the adapter is mounted on the imaging unit or a stereoscopic image capture mode of recording the stereoscopic image; and a control unit performing control to cancel the stereoscopic image capture mode and set the omnidirectional image capture mode in a case where the stereoscopic image capture mode is set when the mounting of the adapter is detected.

16 Claims, 18 Drawing Sheets

(56) References Cited

FOREIGN PATENT DOCUMENTS

| | | | |
|---|---|---|---|
| JP | 2008249782 A | | 10/2008 |
| JP | 2010154310 A | | 7/2010 |
| WO | WO 0219009 A2 | * | 3/2002 |

OTHER PUBLICATIONS

Chinese Office Action for CN Application No. 201110434153.3, dated Jul. 21, 2015.

* cited by examiner

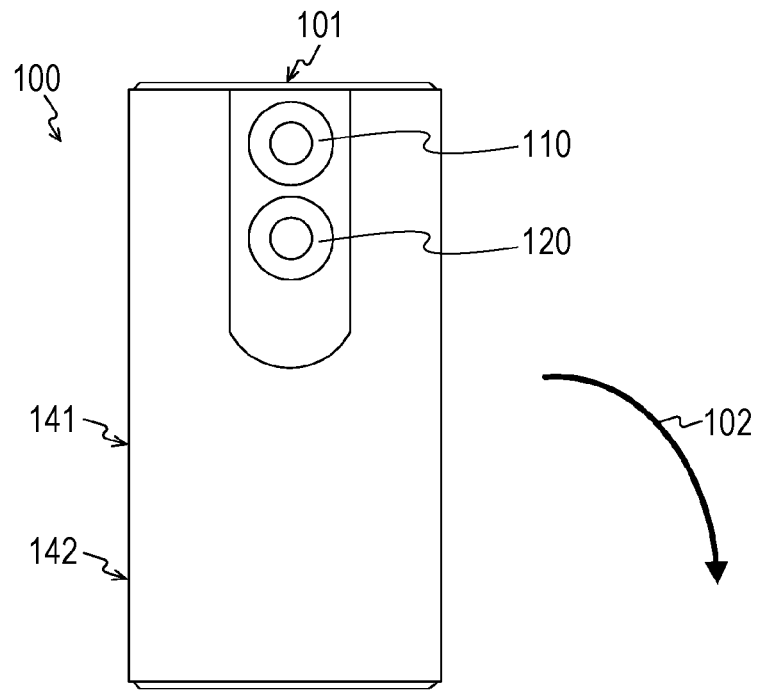
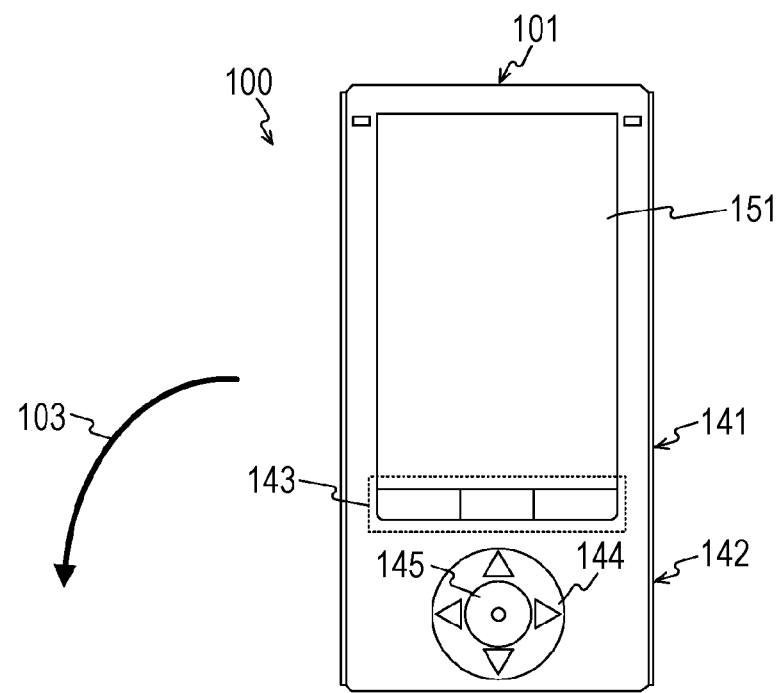

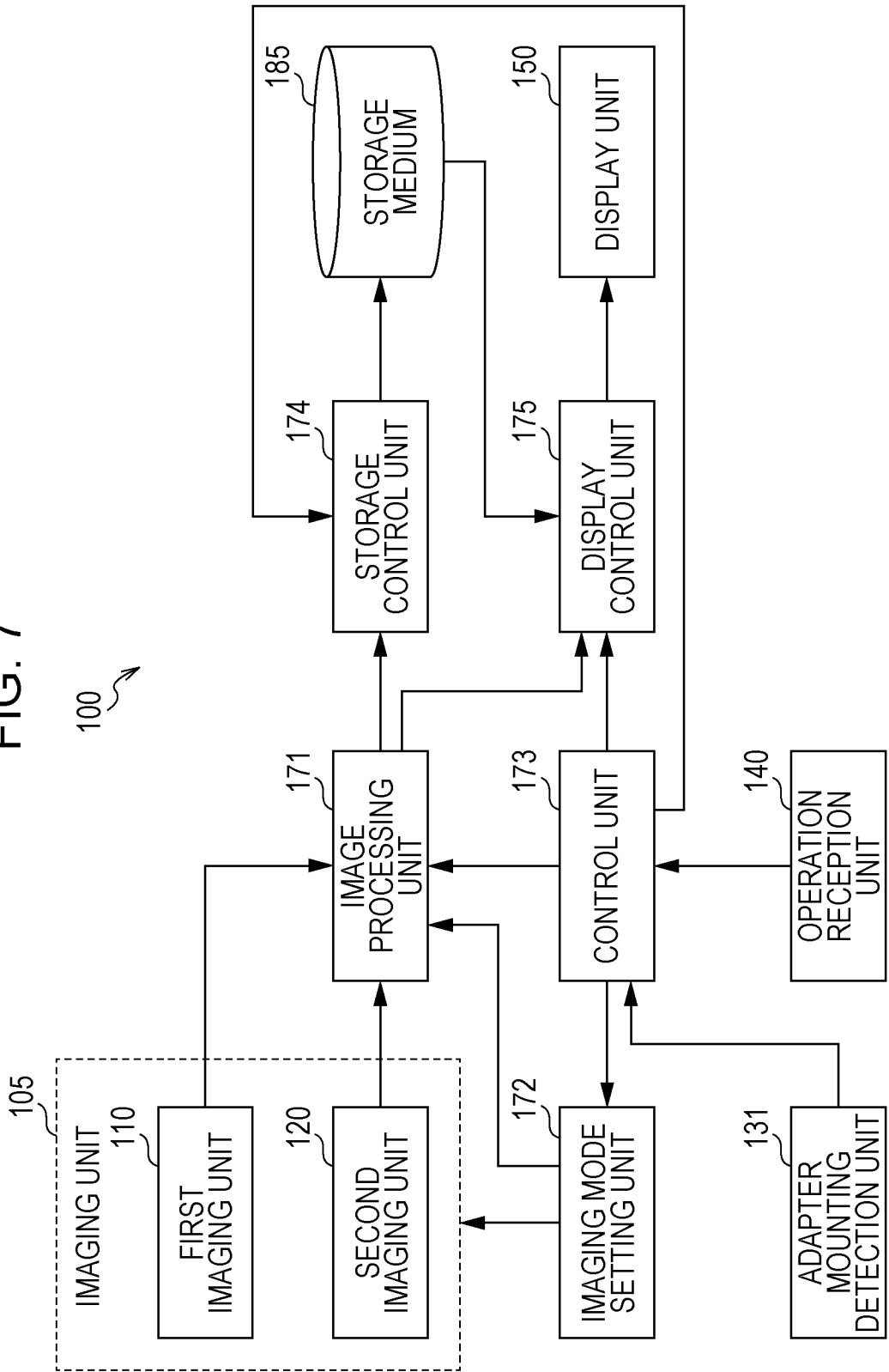

IMAGING APPARATUS, CONTROLLING METHOD THEREOF, AND PROGRAM

CROSS-REFERENCE TO RELATED APPLICATION

The present application claims priority from Japanese Patent Application No. JP 2010-286199 filed in the Japanese Patent Office on Dec. 22, 2010, the entire content of which is incorporated herein by reference.

BACKGROUND

The present disclosure relates to an imaging apparatus, and more particularly, to an imaging apparatus generating a stereoscopic image, a method of controlling the imaging apparatus, and a program causing a computer to execute the method.

Hitherto, there have been suggested imaging apparatuses such as digital still cameras or digital video cameras (camera-integrated recorders) which record a plurality of images (image data) in association with each other to display a stereoscopic image used to obtain a stereoscopic sense of vision by the use of a parallax between right and left eyes.

For example, there has been suggested a two-lens imaging apparatus which includes two optical systems and generates two images as a stereoscopic image using the two optical systems (for example, see Japanese Unexamined Patent Application Publication No. 2000-261829).

SUMMARY

In the above-described technique according to the related art, two images (stereoscopic image) can be generated using the two optical systems. Accordingly, users can watch a stereoscopic image content item recorded in a chosen time by recording the image as a stereoscopic image content item.

In recent years, there have been imaging apparatuses which generate an omnidirectional image by imaging a subject in all directions. It can be considered that a detachable adapter (adapter including an omnidirectional imaging optical system) generating the omnidirectional image is mounted on an imaging apparatus to record the omnidirectional image.

Further, for example, it is considered that the adapter is mounted on an imaging apparatus, which includes two imaging units generating a stereoscopic image, to record an omnidirectional image. In this case, for example, an imaging process is performed by mounting the adapter on one of the two imaging units and setting an omnidirectional image capture mode of recording the omnidirectional image.

However, a case can be considered in which a user only mounts the adapter, forgets to set an omnidirectional image capture mode, and starts an imaging process. Further, a case can be considered in which after the user mounts the adapter and then executes the omnidirectional image capture mode, the user forgets to detach the adapter and sets another image capture mode other than the omnidirectional image capture mode to start the imaging process. In this case, there is a concern that an appropriate captured image may not be recorded.

It is desirable to provide a technique for appropriately setting an image capture mode when an adapter including an omnidirectional imaging optical system is mounted.

According to an embodiment of the disclosure, there is provided an imaging apparatus including: an imaging unit which generates a plane image including a subject by imaging the subject in a specific direction or a stereoscopic image for stereoscopically viewing the subject; an adapter mounting detection unit which detects whether an adapter, which includes an omnidirectional imaging optical system imaging the subject in all directions, is mounted on the imaging unit; an image capture mode setting unit which sets, based on a user operation, an omnidirectional image capture mode of recording the plane image including the subject in all directions in a state where the adapter is mounted on the imaging unit or a stereoscopic image capture mode of recording the stereoscopic image; and a control unit which performs control to cancel the stereoscopic image capture mode and set the omnidirectional image capture mode in a case where the stereoscopic image capture mode is set when the mounting of the adapter is detected. Further, there are provided a method of controlling the imaging apparatus and a program causing a computer to execute the method. Thus, it is possible to obtain an effect of cancelling the stereoscopic image capture mode and setting the omnidirectional image capture mode in a case where the stereoscopic image capture mode is set when the mounting of the adapter is detected.

According to the embodiment of the disclosure, the control unit may perform control to invalidate a setting operation of setting the stereoscopic image capture mode when the setting operation is executed as the user operation in the state where the mounting of the adapter is detected. Thus, it is possible to obtain an effect of invalidating the setting operation when the setting operation is executed to set the stereoscopic image capture mode in a state where the mounting of the adapter is detected.

According to the embodiment of the disclosure, the control unit may perform control to give a notification to invalidate the setting operation when the setting operation is executed. Thus, it is possible to obtain an effect of giving the notification to invalidate the setting operation when the setting operation is executed to set the stereoscopic image capture mode in the state where the mounting of the adapter is detected.

According to the embodiment of the disclosure, the imaging unit may include a first imaging unit generating a first image for displaying the stereoscopic image and a second imaging unit generating a second image for displaying the stereoscopic image. The first imaging unit may generate the plane image including the subject in all directions, when the adapter is mounted on only the first imaging unit and the omnidirectional image capture mode is set. Thus, it is possible to obtain an effect of generating the omnidirectional image by the first imaging unit when the omnidirectional image capture mode is set.

According to the embodiment of the disclosure, the image capture mode setting unit may set one of the omnidirectional image capture mode, the stereoscopic image capture mode, and a plane image capture mode of recording a plane image including the subject in the specific direction based on the user operation. In a case where the plane image capture mode or the stereoscopic image capture mode is set when the mounting of the adapter is detected, the control unit performs control to cancel the set image capture mode and set the omnidirectional image capture mode. Thus, it is possible to obtain an effect of cancelling the set image capture mode and setting the omnidirectional image capture mode when the plane image capture mode or the stereoscopic image capture mode is set when the mounting of the adapter is detected.

According to the embodiment of the disclosure, the plane image including the subject in all directions may be a circular image or an annular image. Thus, it is possible to obtain an effect of generating the circular image or the annular image including the subject in all directions when the omnidirectional image capture mode is set.

According to another embodiment of the disclosure, there is provided an imaging apparatus including: an imaging unit which generates a plane image including a subject by imaging the subject in a specific direction or a stereoscopic image for stereoscopically viewing the subject; an adapter mounting detection unit which detects whether an adapter, which includes an omnidirectional imaging optical system imaging the subject in all directions, is mounted on the imaging unit; an image capture mode setting unit setting, based on a user operation, an omnidirectional image capture mode of recording the plane image including the subject in all directions in a state where the adapter is mounted on the imaging unit or a stereoscopic image capture mode of recording the stereoscopic image; and a control unit which performs control to invalidate a setting operation of setting the stereoscopic image capture mode when the setting operation is executed as the user operation in the state where the mounting of the adapter is detected. Further, there are provided a method of controlling the imaging apparatus and a program causing a computer to execute the method. Thus, it is possible to obtain the effect of invalidating the setting operation when the setting operation is executed to set the stereoscopic image capture mode in the state where the mounting of the adapter is detected.

According to still another embodiment of the disclosure, there is provided an imaging apparatus including: a first imaging unit which generates a first image by imaging a subject in a specific direction; a second imaging unit which generates a second image by imaging the subject in the specific image; an adapter mounting detection unit which detects whether an adapter, which includes an omnidirectional imaging optical system imaging the subject in all directions, is mounted on the first imaging unit; and a control unit which allows the first imaging unit to generate a plane image including the subject in all directions and allows the second imaging unit to generate a plane image including the subject in the specific direction when the mounting of the adapter is detected and which performs control to set a specific image capture mode of recording the plane image including the subject in all directions and the plane image including the subject in the specific direction. Further, there are provided a method of controlling the imaging apparatus and a program causing a computer to execute the method. Thus, it is possible to obtain an effect of setting the specific image capture mode when the mounting of the adapter is detected.

According to the embodiment of the disclosure, the imaging apparatus may further include an image capture mode setting unit which sets, based on a user operation, one of the specific image capture mode, a plane image capture mode of recording the plane image including the subject in the specific direction, and a stereoscopic image capture mode of recording the first and second images as a stereoscopic image for stereoscopically viewing the subject. In a case where the plane image capture mode or the stereoscopic image capture mode is set when the mounting of the adapter is detected, the control unit may perform control to record the plane image generated by the first imaging unit and the plane image generated by the second imaging unit in accordance with the same recording scheme as a recording scheme in setting of the stereoscopic image capture mode by cancelling the set image capture mode and setting the specific image capture mode. Thus, it is possible to obtain an effect of recording the plane image generated by the first imaging unit and the plane image generated by the second imaging unit in accordance with the same recording scheme as the recording scheme in setting of the stereoscopic image capture mode by cancelling the set image capture mode and setting the specific image capture mode in the case where the plane image capture mode or the stereoscopic image capture mode is set when the mounting of the adapter is detected.

According to the embodiments of the disclosure, it is possible to obtain an advantage of appropriately setting the image capture mode when the adapter including the omnidirectional imaging optical system is mounted.

BRIEF DESCRIPTION OF THE DRAWINGS

FIGS. 1A and 1B are diagrams of an example of the outer appearance of an imaging apparatus according to a first embodiment of the disclosure;

FIG. 7 is a block diagram of an example of the functional configuration of the imaging apparatus according to the first embodiment of the disclosure;

DETAILED DESCRIPTION OF EMBODIMENTS

Hereinafter, modes for carrying out the disclosure (hereinafter, referred to as embodiments) will be described. The description will be made in the following order.
1. First Embodiment (Image Capture Mode Setting Control: Setting Example of Appropriate Image Capture Mode when Adapter Is Mounted)
2. Second Embodiment (Image Capture Mode Setting Control: Recording Example of Omnidirectional Image and Plane Image when Adapter Is Mounted)
1. First Embodiment
Example of Outer Appearance of Imaging Apparatus
FIGS. 1A to 2B are diagrams of an example of the outer appearance configuration of an imaging apparatus 100 according to a first embodiment of the disclosure.

Figure 2A:
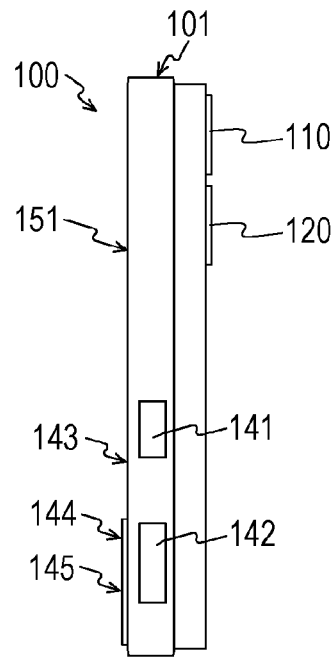
FIGS. 2A and 2B are diagrams of an example of the outer appearance of the imaging apparatus according to the first embodiment of the disclosure.
Figure 2B:
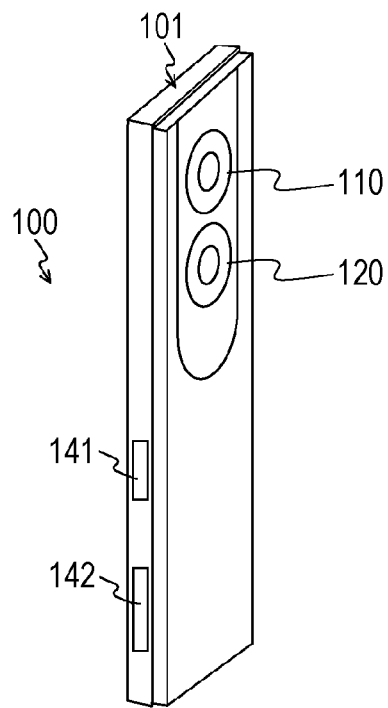

FIG. 1A is a front view of the outer appearance of the front surface (that is, a surface on which a lens facing a subject is installed) of the imaging apparatus 100. FIG. 1B is a rear view of the outer appearance of the rear surface (that is, a surface of an input/output panel 151 facing a photographer) of the imaging apparatus 100. FIG. 2A is a side view of the outer appearance of the side surface of the imaging apparatus 100. FIG. 2B is a perspective view of the outer appearance of the front surface side of the imaging apparatus 100. For example, the imaging apparatus 100 includes two imaging units capturing a stereoscopic image. The imaging apparatus 100 is an imaging apparatus which images a subject, generates two images (image data), and records the images (a right-eye image and a left-eye image) in association therewith. Examples of the imaging apparatus include a digital still camera and a digital video camera (for example, a camera-integrated recorder).

The imaging apparatus 100 includes a first imaging unit 110, a second imaging unit 120, a power switch 141, a shutter button 142, an operation button group 143, right, left, up, and down buttons 144, a recording button 145, and an input/output panel 151. An adapter 200 shown in FIGS. 3A to 4B is mounted on an upper end section 101 of the imaging apparatus 100. A surface (an upper end surface of the upper end section 101) coming into contact with the adapter 200 (a magnetic is installed in a surface coming into contact with the upper end section 101) has a magnetic body in order to fix the adapter 200 mounted on the upper end section 101.

The first imaging unit 110 generates a left-eye image to generate a stereoscopic image. The second imaging unit 120 generates a right-eye image to generate a stereoscopic image. For example, when an imaging process is performed to capture a stereoscopic image, the imaging apparatus 100 is rotated by 90 degrees so that the imaging apparatus 100 is horizontally long, as indicated by the direction of an arrow 102 (an arrow 103 shown in FIG. 1B) shown in FIG. 1A. When an adapter 200 is mounted, the imaging process is performed using the first imaging unit 110. The first imaging unit 110 and the second imaging unit 120 will be described in detail with reference to FIGS. 6 and 7.

The power switch 141 is an operation member used to turn on/off the power of the imaging apparatus 100.

The shutter button 142 is an operation member pressed down by the user when an image (image data) generated by at least one of the first imaging unit 110 and the second imaging unit 120 is recorded as a content item (still image content item). For example, focus control is performed to perform autofocus when the shutter button 142 is pressed down halfway in a case where a stereoscopic image capture mode (3D image capture mode) of recording a stereoscopic image is set. Further, the focus control is performed to record the images (image data) generated by the first imaging unit 110 and the second imaging unit 120 as a content item (still image (stereoscopic image) content item) when the shutter button 142 is pressed down fully. For example, the images are recorded in a memory card 180 shown in FIG. 6.

The operation button group 143 is operation buttons used to execute various operations.

The right, left, up, and down buttons 144 are operation buttons used to execute various right, left, up, and down operations.

The recording button 145 is an operation member pressed down by a user when the image (image data) generated by at least one of the first imaging unit 110 and the second imaging unit 120 is recorded as a content item (moving image content item). For example, when the stereoscopic image capture mode of recording a stereoscopic image is set and the recording button 145 is pressed down, a process starts to record the images (image data) generated by the first imaging unit 110 and the second imaging unit 120. When the recording button 145 is pressed down again, the process of recording the images (image data) ends. The content item (moving image (stereoscopic image) content item) is recorded in, for example, the memory card 180 shown in FIG. 6 through the recording process.

The input/output panel 151 displays various images and receives an input operation from a user based on a detection state of an object approaching or coming into contact with a display surface. The input/output panel 151 is also referred to as a touch screen or a touch panel. The input/output panel 151 includes an operation reception unit and a display panel. For example, an electrostatic type (electric capacity type) touch panel detecting touch or proximity of an object (for example, a finger of a person) with conductivity based on a variation in electric capacity can be used as the operation reception unit. For example, a display panel such as an LCD (Liquid Crystal Display) or an organic EL (Electro Luminescence) panel can be used as the display panel. For example, the input/output panel 151 is formed by superimposing a transparent touch panel on the display surface of the display panel.
Examples of Outer Appearance Configurations of Imaging Apparatus and Adapter FIGS. 3A to 4B are diagrams of an example of the outer appearance configurations of the imaging apparatus 100 and the adapter 200 according to the first embodiment of the disclosure. FIGS. 3A to 4B show the outer appearance configuration when the adapter 200 is mounted on the imaging apparatus 100 shown in FIGS. 1A to 2B.

Figure 3A:
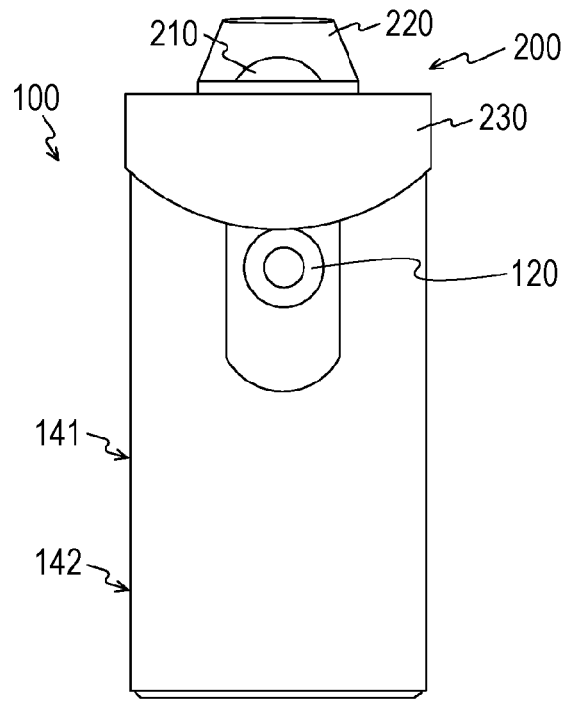
FIGS. 3A and 3B are diagrams of an example of the outer appearance of the imaging apparatus and an adapter according to the first embodiment of the disclosure.
Figure 3B:
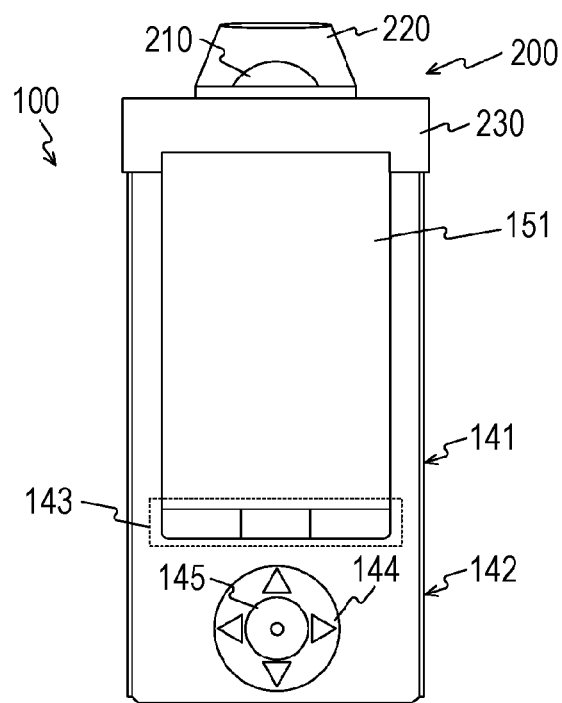
Figure 4A:
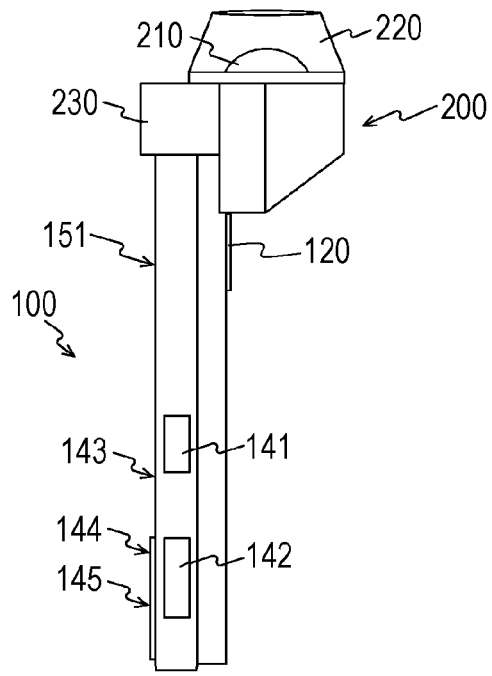
FIGS. 4A and 4B are diagrams of an example of the outer appearance of the imaging apparatus and the adapter according to the first embodiment of the disclosure.
Figure 4B:
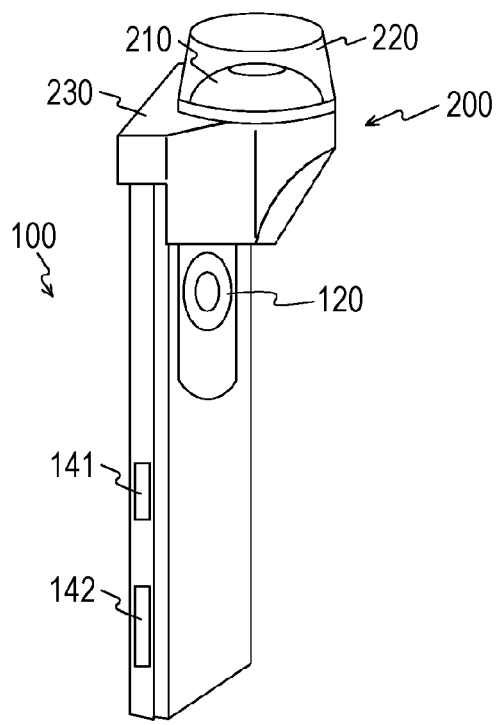

FIG. 3A is a front view of the outer appearances of the front surfaces of the imaging apparatus 100 and the adapter 200. FIG. 3B is a rear view of the outer appearance of the rear surfaces of the imaging apparatus 100 and the adapter 200. FIG. 4A is a side view of the outer appearances of the side surfaces of the imaging apparatus 100 and the adapter 200. FIG. 4B is a perspective view of the outer appearances of the front surface side of the imaging apparatus 100 and the adapter 200.

Figure 5:
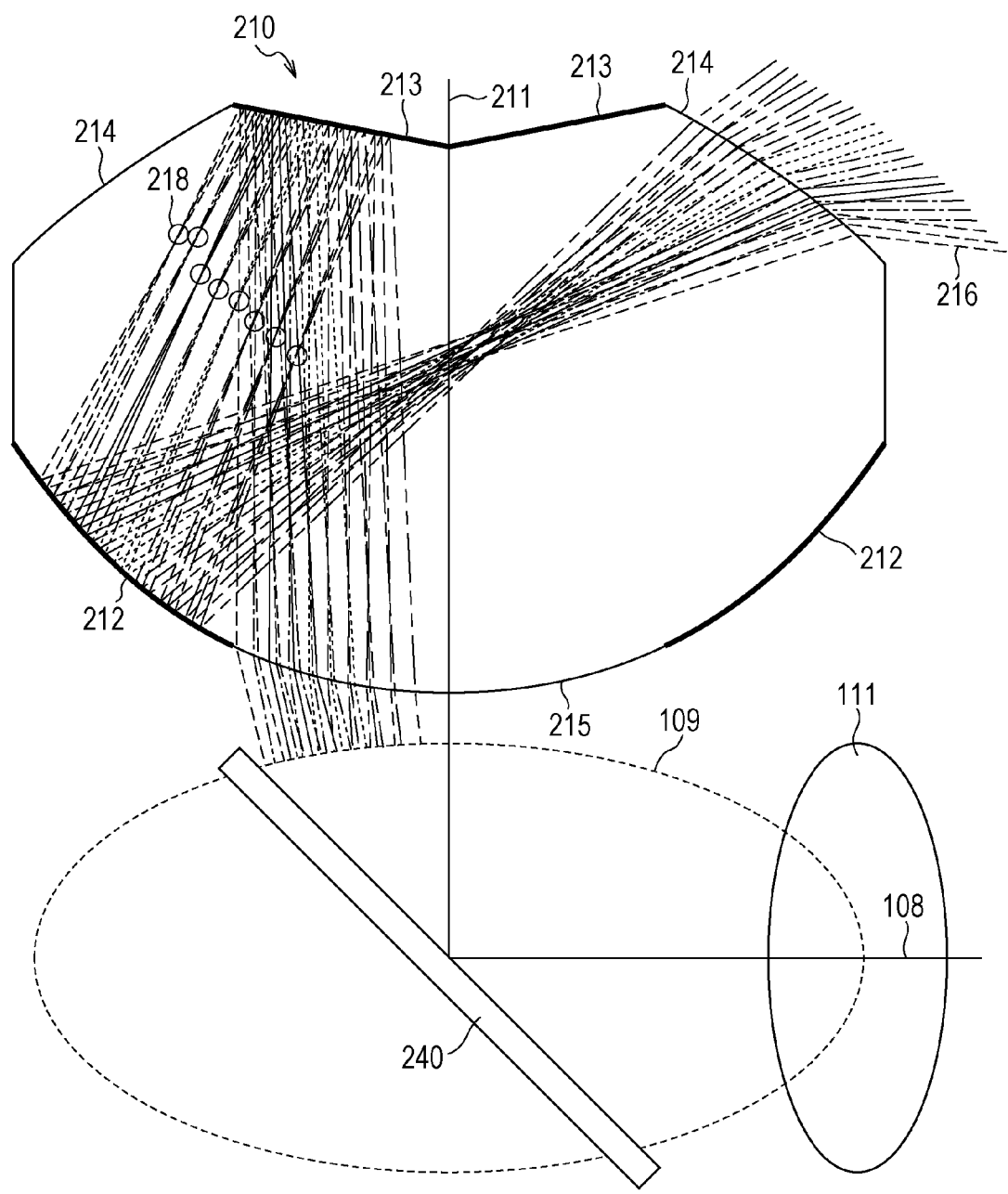
FIG. 5 is a sectional view of an omnidirectional imaging optical system equipped with the adapter according to the first embodiment of the disclosure.

The adapter 200 is an adapter detachably mounted on the imaging apparatus 100 and an omnidirectional (entire circumference) imaging attachment. The adapter 200 includes an omnidirectional imaging optical system 210, a cover 220, a mounting unit 230, and a mirror 240. The mirror 240 is shown in FIG. 5.

The omnidirectional imaging optical system 210 is an optical system which images a subject in all directions (entire circumference) of the imaging apparatus 100. The omnidirectional imaging optical system 210 will be described in detail with reference to FIG. 5.

The cover 220 is a cylindrical cover which covers the omnidirectional imaging optical system 210.

The mounting unit 230 is a mounting unit which mounts the adapter 200 on the imaging apparatus 100 and has a shape fitted in the upper end section 101 (shown in FIGS. 1A to 2B) of the imaging apparatus 100. A magnetic 201 (shown in FIG. 6) is installed in the bottom portion (portion coming into contact with the upper end surface of the upper end section 101 of the imaging apparatus 100) in a concave portion of the mounting unit 230. Therefore, when the mounting unit 230 is fitted in the upper end section 101 of the imaging apparatus 100, the adapter 200 is fixed to the upper end section 101 of the imaging apparatus 100 by the magnet 201. When the adapter 200 is mounted on the imaging apparatus 100, the first imaging unit 110 is covered with the mounting unit 230. In this case, an omnidirectional subject image condensed by the omnidirectional imaging optical system 210 of the adapter 200 is incident on an imaging optical system 111 (shown in FIG. 6) of the first imaging unit 110 so as to be formed on an imaging element 112 (shown in FIG. 6).

The omnidirectional imaging process can be performed using the imaging apparatus 100 having no omnidirectional imaging optical system by mounting the adapter 200 including the omnidirectional imaging optical system 210 on the first imaging unit 110. The omnidirectional imaging process is a process of imaging a subject present in all directions (0° to 360°) of the imaging apparatus 100.

When the adapter 200 is mounted, a subject in all directions of the imaging apparatus 100 is imaged using both the omnidirectional imaging optical system 210 of the adapter 200 and the imaging optical system 111 of the first imaging unit 110. As shown in FIGS. 9A to 10B and the like, an omnidirectional image 420 formed by imaging the subject in all directions of the imaging apparatus 100 is generated through the omnidirectional imaging process by the use of the omnidirectional imaging optical system 210. The generated omnidirectional image 420 is displayed as a through image on the input/output panel 151.

As shown in FIGS. 1A to 2B, it is assumed that the adapter 200 is not mounted on the first imaging unit 110. In this case, when a plane image capture mode (2D image capture mode) is set, the imaging apparatus 100 performs a plane image capture process using only the built-in imaging optical system 111. The plane image capture process is a process of imaging a subject present in a specific single direction (imaging direction facing an optical axis of the imaging optical system 111) with reference to the position (imaging position) of the imaging apparatus 100 at the imaging time by the use of only the imaging optical system 111. The plane image capture process is a process of generating a plane image (2D image). In the plane image capture process, a subject image in a single direction is incident via the imaging optical system 111 and is formed on the imaging element 112.

Further, it is assumed that the stereoscopic image capture mode (3D image capture mode) is set when the adapter 200 is not mounted on the first imaging unit 110. In this case, the imaging apparatus 100 performs a stereoscopic image capture process using the built-in imaging optical system 111 and the imaging optical system 121 (shown in FIG. 6) included therein. The stereoscopic image capture process is a process of imaging a subject present in a specific single direction (optical axis direction) with reference to the imaging position of the imaging apparatus 100 by the use of the imaging optical system 111 and the imaging optical system 121 and is a process of generating a stereoscopic image (3D image). In the stereoscopic image capture process, the subject image in a single direction is incident via the imaging optical system 111 to be formed on the imaging element 112 and is incident via the imaging optical system 121 to be formed on an imaging element 122.

As shown in FIGS. 1A to 4B, the adapter 200 is detachably mounted on the first imaging unit 110 of the imaging apparatus 100. In this way, the user can easily execute the omnidirectional image capture process with the imaging apparatus 100 by mounting the adapter 200 on the first imaging unit 110.

Example of Configuration of Omnidirectional Imaging Optical System

FIG. 5 is a sectional view of the omnidirectional imaging optical system 210 equipped with the adapter 200 according to the first embodiment of the disclosure. FIG. 5 shows the omnidirectional imaging optical system 210 reflecting light twice as an example.

The omnidirectional imaging optical system 210 is an omnidirectional imaging lens which includes a convex surface mirror and a concave surface mirror which have a shape rotationally symmetric with respect to a central axis 211. Further, the central axis 211 is disposed on a line of which an angle formed with an optical axis 108 of the imaging optical system 111 of the first imaging unit 110 is 90 degrees. That is, the subject image condensed by the omnidirectional imaging optical system 210 is reflected from the mirror 240, is changed by 90 degrees in its optical path, and is supplied to the imaging optical system 111.

The omnidirectional imaging optical system 210 includes first reflection surfaces 212, second reflection surfaces 213, light-incident portions 214, and an light-exit portion 215.

The first reflection surfaces 212 are annular reflection surfaces disposed at the lower portion of the omnidirectional imaging optical system 210 and are formed of an annular concave surface mirror which is mirror-finished. The second reflection surfaces 213 are conical reflection surfaces facing the first reflection surfaces 212 and are formed of a convex surface mirror which is mirror-finished.

The light-incident portions 214 are annular light-incident portions disposed in the outer circumference of the second reflection surfaces 213 and are formed by a transparent glass plate so as to pass light. The light-exit portion 215 is a light-exit portion disposed in the inner circumference of the first reflection surfaces 212 and is formed of a transparent glass plate so that light can pass.

Since the omnidirectional imaging optical system 210 reflects light twice, the optical characteristics of the omnidirectional imaging optical system 210 are designed so that all focuses 218 of a subject distant by any distance from the omnidirectional imaging optical system 210 are located between the first reflection surface 212 and the second reflection surface 213. In FIG. 5, a plurality of circles schematically indicates the focuses 218 of the subject.

In the omnidirectional imaging optical system 210, when incident light 216 is incident from the light-incident portion 214, the incident light is reflected from the first reflection surface 212, is reflected from the second reflection surface 213, and then exits from the light-exit portion 215. Then, the light exiting from the light-exit portion 215 is reflected from a mirror 240, so that the light path of the light is changed by 90 degrees, is incident on the imaging optical system 111 of the first imaging unit 110 so as to be supplied to the imaging element 112. In FIG. 5, only the light exiting from the light-exit portion 215 is illustrated up to an ellipse 109 corresponding to the imaging optical system 111 to facilitate the description.

In this way, the omnidirectional imaging optical system 210 can acquire the subject image in the range of 360° with reference to the central axis 211. Therefore, the omnidirectional imaging optical system 210 can condense the subject image in all directions (360°) in the circumference of the omnidirectional imaging optical system 210 and can supply the subject image to the imaging optical system 111.

In FIG. 5, the omnidirectional imaging optical system 210 reflecting light twice has been exemplified, but an omnidirectional imaging optical system reflecting light once may be used. The omnidirectional imaging optical system reflecting light once includes only one reflection surface reflecting light from a subject in all directions. In the omnidirectional imaging optical system reflecting light once, the one reflection surface is formed of a convex surface mirror having a shape rotationally symmetric with reference to the central axis and is disposed so that light reflected from the reflection surface travels toward the imaging optical system 111 of the imaging apparatus 100.

Example of Inner Configuration of Imaging Apparatus

Figure 6:
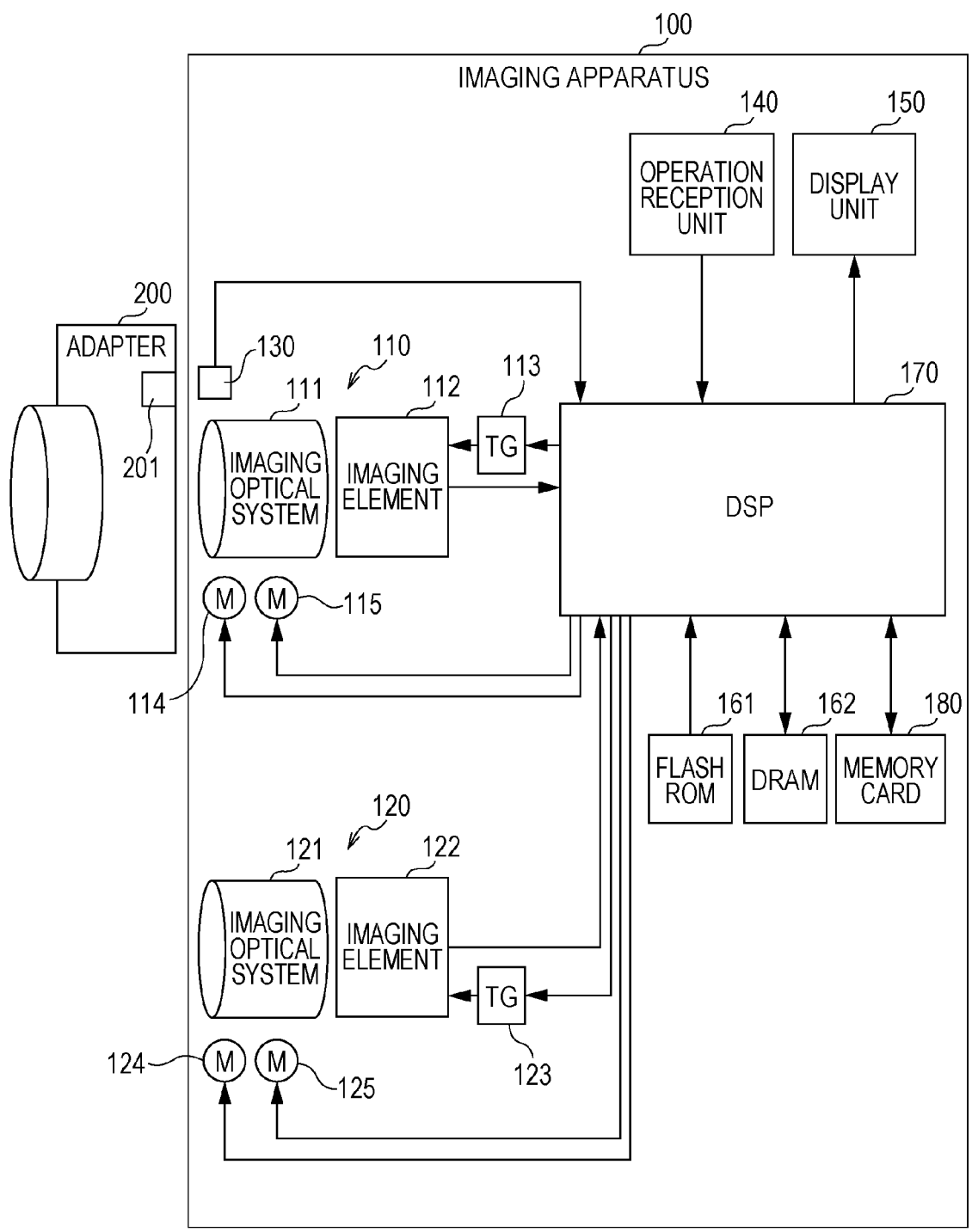
FIG. 6 is a block diagram of an example of the inner configuration of the imaging apparatus according to the first embodiment of the disclosure.

FIG. 6 is a block diagram of an example of the inner configuration of the imaging apparatus 100 according to the first embodiment of the disclosure. FIG. 6 shows the inner configuration of the imaging apparatus 100 and the adapter 200 mounted on the imaging apparatus 100.

The imaging apparatus 100 includes the first imaging unit 110, the second imaging unit 120, a hall sensor 130, an operation reception unit 140, a display unit 150, and a flash ROM (Read Only Memory) 161. The imaging apparatus 100 further includes a DRAM (Dynamic Random Access Memory) 162, a DSP (Digital Signal Processor) 170, and the memory card 180.

The first imaging unit 110 and the second imaging unit 120 are configured such that pairs of right and left optical systems and imaging elements are formed to generate right-eye and left-eye images. That is, the first imaging unit 110 includes an imaging optical system 111, an imaging element 112, a TG (Timing Generator) 113, and optical component driving units 114 and 115. Further, the second imaging unit 120 includes an imaging optical system 121, an imaging element 122, a TG 123, and optical component driving units 124 and 125.

The configurations (each optical system, each imaging element, and the like) of the first imaging unit 110 and the second imaging unit 120 are the same as each other except that the locations where the units are disposed are different from each other. Therefore, one of the right and left configurations will not be partially described below.

The imaging optical system 111 is an optical system optically designed to image a subject in a single direction. The imaging optical system 111 includes various lenses such as a focus lens and a zoom lens and optical components such as an optical filter removing an unnecessary wavelength and a diaphragm. An optical image (subject image) incident from a subject is formed on the exposure surface of the imaging element 112 via the respective optical components of the imaging optical system 111. In the imaging optical system 111, the optical component driving units 114 and 115 driving the optical components of the imaging optical system 111 are mechanically connected to each other.

The imaging element 112 generates an electric signal (analog image signal) by photoelectrically converting the optical image supplied from the imaging optical system 111 and outputs the generated electric signal to the DSP 170. For example, a solid-state imaging element (image sensor) such as a CCD (Charge Coupled Device) or a CMOS (Complementary Metal Oxide Semiconductor) can be used as the imaging element 112.

The TG 113 is a timing generator which generates operation pulses necessary for the imaging element 112 under the control of the DSP 170. The TG 113 generates various kinds of pulses such as a 4-phase pulse used for vertical transmission, a field shift pulse, a 2-phase pulse used for horizontal transmission, and a shutter pulse and supplies the generated pulses to the imaging element 112. The subject image is captured by driving the imaging element 112 by the TG 113. The TG 113 adjusts a shutter speed of the imaging element 112 to control an exposure amount or an exposure period of the captured image (electronic shutter function).

The optical component driving units 114 and 115 drive the optical components of the imaging optical system 111 under the control of the DSP 170 and includes, for example, a zoom motor and a focus motor. The optical component driving units 114 and 115 adjust the diaphragm, for example, by moving the zoom lens, the focus lens, and the like of the imaging optical system 111.

The hall sensor 130 is a hall sensor which is installed in the inner portion (portion adjacent to the magnet 201 when the adapter 200 is mounted) of the upper end section 101. The hall sensor 130 detects the magnetic flex density of a magnetic field generated by the magnet 201 when the adapter 200 is mounted. As described above, the magnet 201 is installed in the bottom portion (portion coming into contact with the upper end surface of the upper end section 101 of the imaging apparatus 100) in the concave portion of the mounting unit 230 of the adapter 200.

For example, when the adapter 200 is mounted on the upper end section 101 of the imaging apparatus 100, the hall sensor 130 detects the magnetic field with a magnetic flux density equal to or greater than a predetermined magnetic flux density from the magnet 201 in that the magnet 201 is disposed near the hall sensor 130. On the other hand, when the adapter 200 is not mounted on the upper end section 101 of the imaging apparatus 100, the hall sensor 130 does not detect the magnetic field with a magnetic flux density equal to or greater than the predetermined magnetic flux density from the magnet 201. In this way, it is possible to detect whether the adapter 200 is mounted on the upper end section 101 of the imaging apparatus 100 depending on the strength of the magnetic field detected by the hall sensor 130. Further, the hall sensor 130 outputs information (magnetic field strength information) on the detected strength of the magnetic field to the DSP 170. Then, based on the magnetic field strength information, the DSP 170 determines whether the adapter 200 is mounted on the first imaging unit 110 (whether the adapter 200 is mounted). The DSP 170 switches various process settings of the imaging apparatus 100 depending on whether the adapter 200 is mounted.

The operation reception unit 140 is an operation reception unit which receives an input operation from a user and outputs an operation signal to the DSP 170 in response to the received input operation. The operation reception unit 140 corresponds to, for example, the power switch 141, the shutter button 142, the operation button group 143, the right, left, up, and down buttons 144, the recording button 145, and the input/output panel 151 shown in FIGS. 1A to 4B.

The display unit 150 is configured by, for example, a liquid crystal display (LCD) or an organic EL display. The display unit 150 displays various kinds of input image data under the control of the DSP 170. For example, the display unit 150 displays the captured image (through image) being captured and input in real time from the DSP 170 during the imaging process. Thus, the user can operate the imaging apparatus 100 while viewing the image on the display unit 150 during the imaging process. When a user gives an instruction to reproduce the content item stored in the memory card 180, the display unit 150 displays the content item input from the DSP 170. In this way, the user can confirm the details of the content item stored in the memory card 180.

The flash ROM 161 is a memory which stores a program executing various control processes of the DSP 170. The DSP 170 operates in accordance with a program stored in the flash ROM 161 and performs an arithmetic control process necessary for each control using the DRAM 162. The program may be supplied to the DSP 170 from a removable recording medium such as a disc-shaped recording medium or a memory card or may be downloaded to the DSP 170 via a network such as the Internet.

The DSP 170 is an arithmetic processing device which controls image processing of the captured image or the processes of the imaging apparatus 100. The DSP 170 includes a signal processing unit (not shown), a recording reproduction unit (not shown), and a control unit (not shown). For example, the signal processing unit performs predetermined signal processing on image signals (analog image signals) output from the imaging elements 112 and 122 and outputs the image signals (digital image signals) subjected to the signal processing to the display unit 150 or the recording reproduction unit. For example, the signal processing unit includes an analog signal processing unit, an A/D (analog/digital) conversion unit, and a digital signal processing unit.

The analog signal processing unit is a processing unit (so-called analog front-end) performing pre-processing on the image signals. For example, the analog signal processing unit performs a CDS (Correlated Double Sampling) process, a gain process of a programmable gain amplifier (PGA), or the like on the image signals output from the imaging elements 112 and 122. The A/D conversion unit converts the image signals (analog image signals) output from the analog signal processing unit into digital image signals and outputs the digital image signals to the digital signal processing unit. The digital signal processing unit performs digital signal processing, such as noise removal, white balance adjustment, color correction, edge enhancement, or gamma correction, on the digital image signals output from the A/D conversion unit and outputs the processed digital image signals to the display unit 150, the recording reproduction unit, and the like.

The control unit of the DSP 170 is configured by an arithmetic processing device such as a micro-controller installed in the DSP 170 and controls the entire processes of the imaging apparatus 100. The control unit performs a control function using, for example, the DRAM 162 or the flash ROM 161. For example, the control unit of the DSP 170 controls the imaging process of the first imaging unit 110 by controlling the TG 113, the TG 123, and the optical component driving units 114, 115, 124, and 125. For example, the control unit of the DSP 170 performs automatic exposure control, for example, by adjusting the diaphragms of the imaging optical systems 111 and 121, setting the electronic shutter speeds of the imaging elements 112 and 122, and setting the gain of AGC of the signal processing unit (AE function). The control unit of the DSP 170 performs auto-focus control to automatically adjust the focuses of the imaging optical systems 111 and 121 for a specific subject by moving the focus lenses of the imaging optical systems 111 and 121 (AF function). The control unit of the DSP 170 adjusts an image angle of the captured image by moving the zoom lenses of the imaging optical systems 111 and 121. The control unit of the DSP 170 controls a recording reproduction process on the captured image data in the recording reproduction unit. The control unit of the DSP 170 performs display control to display various kinds of display data on the display unit 150.

The memory card 180 is a recording medium detachably mounted on the imaging apparatus 100. For example, a disc-shaped recording medium such as another semiconductor memory, an optical disc, or a hard disk may be used as the recording medium. For example, a Blu-ray disc, a DVD (Digital Versatile Disc), or a CD (Compact Disc) may be used as the optical disc. The recording medium may be built in the imaging apparatus 100 or may be a removable medium detachably mounted on the imaging apparatus 100.

Example of Functional Configuration of Imaging Apparatus

FIG. 7 is a block diagram of an example of the functional configuration of the imaging apparatus 100 according to the first embodiment of the disclosure. The same reference numerals are given to the functionally same elements as those shown in FIG. 6 and the description thereof will not be partially repeated.

The imaging apparatus 100 includes an imaging unit 105, an adapter mounting detection unit 131, an operation reception unit 140, a display unit 150, an image processing unit 171, an image capture mode setting unit 172, a control unit 173, a recording control unit 174, and a display control unit 175, and a recording medium 185. The imaging unit 105 includes the first imaging unit 110 and the second imaging unit 120. The recording medium 185 corresponds to the memory card 180 shown in FIG. 6. The image processing unit 171, the image capture mode setting unit 172, the control unit 173, and the recording control unit 174, and the display control unit 175 correspond to the DSP 170 shown in FIG. 6. The adapter mounting detection unit 131 corresponds to the hall sensor 130 shown in FIG. 6.

The imaging unit 105 is an imaging unit which images a subject in a specific direction (for example, an optical axis direction) and generates a plane image including the subject or a stereoscopic image for stereoscopically viewing the subject and which performs an imaging process in accordance with the image capture mode set by the image capture mode setting unit 172. One of the plane image capture mode, the stereoscopic image capture mode, and the omnidirectional image capture mode is set as the image capture mode. The plane image capture mode is an image capture mode of recording a plane image including the subject in a specific direction (for example, an optical axis direction). The stereoscopic image capture mode is an image capture mode of recording a stereoscopic image including a subject in a specific direction (for example, an optical axis direction). The omnidirectional image capture mode is an image capture mode of recording a plane image including the subject in all directions when the adapter 200 is mounted on the first imaging unit 110. These image capture modes can be set for either a still image capture mode of recording a still image or a moving image capture mode of recording a moving image. That is, when one of the plane image capture mode, the stereoscopic image capture mode, and the omnidirectional image capture mode is set, either a still image recording process or a moving image recording process can be performed based on a user operation.

Specifically, the imaging unit 105 includes the first imaging unit 110 and the second imaging unit 120. For example, when the plane image capture mode is set, the first imaging unit 110 generates a plane image by imaging a subject in a specific direction. When the stereoscopic image capture mode is set, the first imaging unit 110 and the second imaging unit 120 generate a stereoscopic image. That is, the first imaging unit 110 generates a first image (left-eye image) used to display the stereoscopic image by imaging a subject in a specific direction and the second imaging unit 120 generates a second image (right-eye image) used to display the stereoscopic image by imaging the subject in the specific direction. When the omnidirectional image capture mode is set, the first imaging unit 110 generates an annular plane image (omnidirectional image) by imaging a subject in all directions. Then, the imaging unit 105 outputs the generated image to the image processing unit 171.

The adapter mounting detection unit 131 detects whether the adapter 200 is mounted on the upper end section 101 of the imaging apparatus 100 and outputs the detection result (adapter mounting information) to the control unit 173.

The image processing unit 171 performs various kinds of imaging processing on the image output from the imaging unit 105 under the control of the control unit 173 and outputs the image subjected to the image processing to the recording control unit 174 and the display control unit 175. Further, the image processing unit 171 performs imaging processing in accordance with the image capture mode set by the image capture mode setting unit 172. The image processing unit 171 corresponds to the signal processing unit of the DSP 170.

The image capture mode setting unit 172 sets the image capture mode for the imaging unit 105 under the control of the control unit 173. Specifically, the image capture mode setting unit 172 sets, as the image capture mode, one of the plane image capture mode, the stereoscopic image capture mode, and the omnidirectional image capture mode. When the adapter 200 is not mounted on the first imaging unit 110, the image capture mode is set based on a user operation (setting operation) received by the operation reception unit 140. On the other hand, when the adapter 200 is mounted on the first imaging unit 110, the omnidirectional image capture mode is set. That is, in a case where the plane image capture or the stereoscopic image capture mode is set when the mounting of the adapter 200 is detected, the set image capture mode is cancelled and the omnidirectional image capture mode is set. Further, when the setting operation of setting the plane image capture mode or the stereoscopic image capture mode is performed as the user operation in the state where the mounting of the adapter 200 is detected, the setting operation is invalidated.

In the imaging apparatus 100, an optimum imaging parameter used to control zoom, focus, exposure, or the like is set in accordance with the characteristics of the imaging optical systems 111 and 121 mounted in advance. Further, the setting of a display process or the setting of operation control in the imaging apparatus 100 are also designed in accordance with the characteristics of the imaging optical systems 111 and 121. Accordingly, when the adapter 200 is mounted on the imaging apparatus 100, it is necessary to change the setting of the imaging parameter or change the setting of the display process or the operation control in accordance with the characteristics of the omnidirectional imaging optical system 210 mounted on the adapter 200. In the first embodiment of the disclosure, when the adapter 200 is mounted on the imaging apparatus 100, the various kinds of setting of the imaging apparatus 100 are automatically controlled in accordance with the characteristics of the omnidirectional imaging optical system 210. That is, in the setting process of the image capture mode, for example, setting (for example, setting of imaging parameters regarding the imaging process) regarding the imaging process performed by the imaging unit 105, setting regarding the display process performed by the display unit 150, and setting of the control of the user operation using the operation reception unit 140 are automatically performed.

Figure 12:
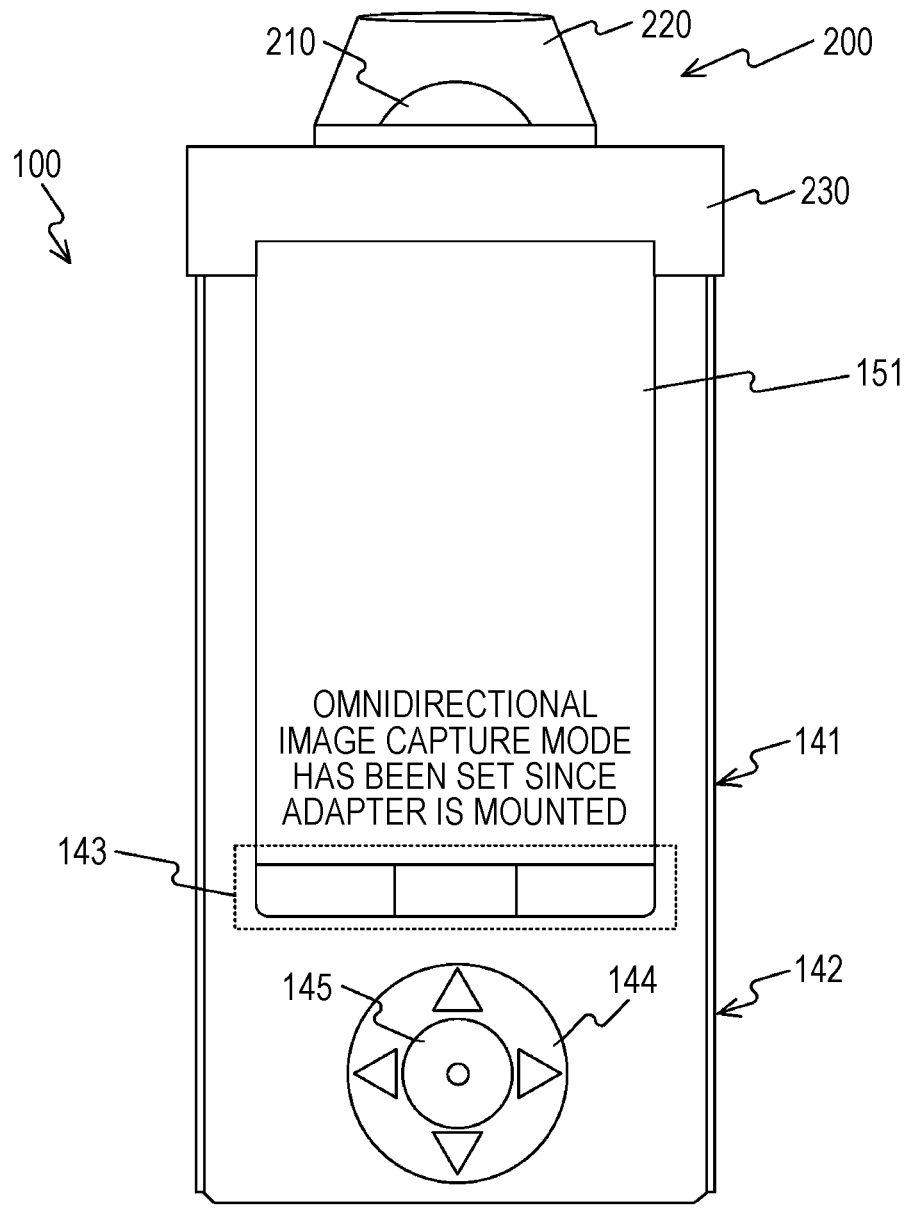
FIG. 12 is a diagram of a notification example when the adapter is mounted on the imaging apparatus according to the first embodiment of the disclosure.
Figure 13:
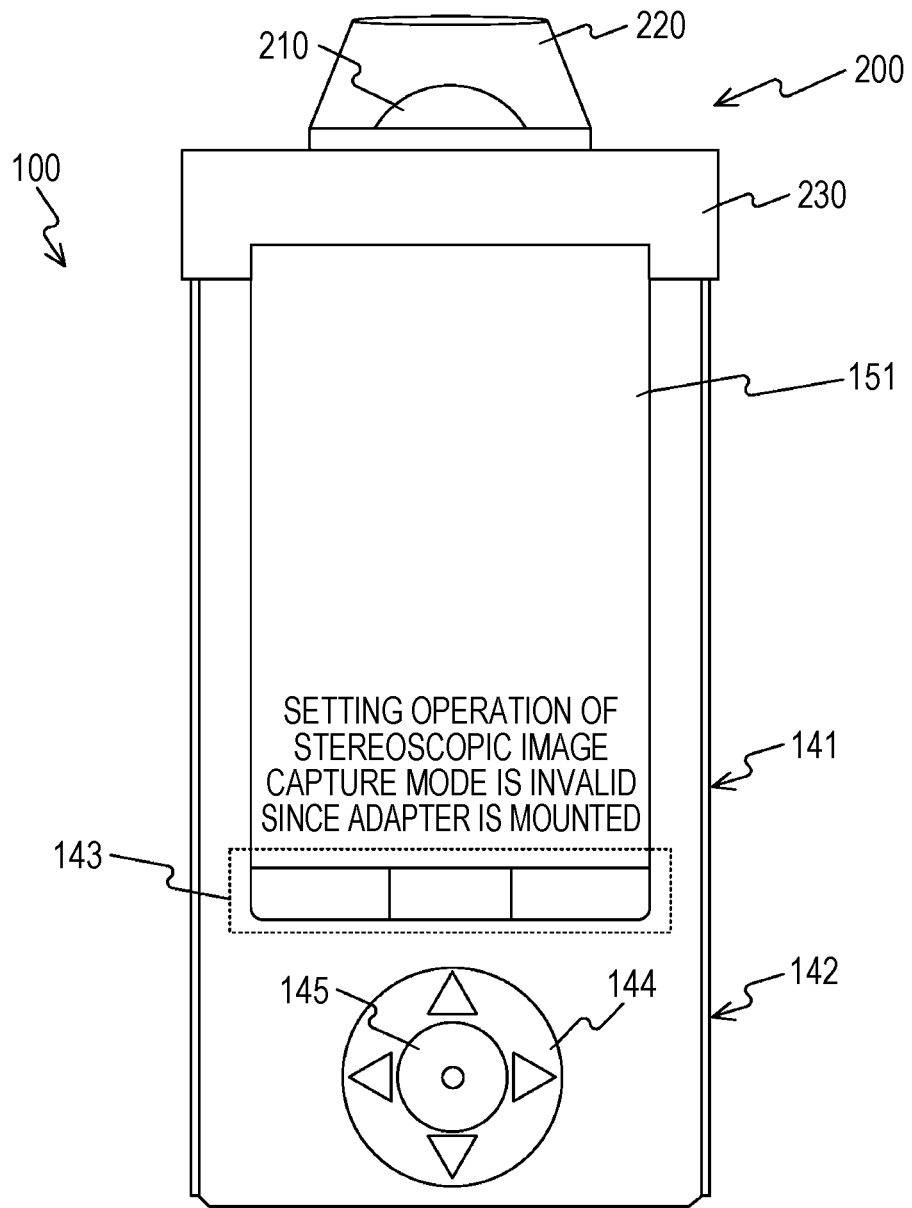
FIG. 13 is a diagram of a notification example when the adapter is mounted on the imaging apparatus according to the first embodiment of the disclosure.

The control unit 173 performs the control of the entire imaging apparatus 100. For example, the control unit 173 performs control in response to an input operation of the user received by the operation reception unit 140. For example, the control unit 173 performs control to cancel the set image capture mode and set the omnidirectional image capture mode in a case where the plane image capture mode or the stereoscopic image capture mode is set when the mounting of the adapter 200 is detected. In this case, the control unit 173 performs control to give a notification of the reason for cancelling the set image capture mode and set the omnidirectional image capture mode. For example, the reason for cancelling the set image capture mode and setting the omnidirectional image capture mode is displayed, as shown in FIG. 12. When a setting operation of setting the plane image capture mode or the stereoscopic image capture mode is performed as the user operation in the state where the mounting of the adapter 200 is detected, the control unit 173 performs control to invalidate the setting operation. In this case, the control unit 173 performs control to give a notification to invalidate the setting operation. For example, the reason for invalidating the setting operation is displayed, as shown in FIG. 13. The notification may be given through audio output, vibration, or the like. The control unit 173 corresponds to the control unit of the DSP 170.

The recording control unit 174 performs a compression recording process on the image output from the image processing unit 171 under the control of the control unit 173. For example, the recording control unit 174 compresses the captured image (frame) in accordance with a predetermined compression coding scheme when the image capture mode is set and the recording button 145 (shown in FIGS. 1A and 1B and the like) is pressed down. The signals of the compressed image are recorded as a moving image content item in the recording medium 185. The recording control unit 174 compresses the captured image (still image) in accordance with a predetermined compression coding scheme and records the compressed captured image as a still image content item in the recording medium 185, when the image capture mode is set and the shutter button 142 (shown in FIGS. 2A and 2B and the like) is pressed down.

The display control unit 175 displays the image output from the image processing unit 171 or the image stored in the recording medium 185 on the display unit 150 under the control of the control unit 173. For example, the display control unit 175 displays the image output from the image processing unit 171 as a through image on the display unit 150 when the image capture mode is set. When a reproduction mode is set, the display control unit 175 acquires a content item associated with a reproduction instruction operation from the operation reception unit 140 from the recording medium 185, decompresses the compressed image data, and displays the decompressed image data on the display unit 150. The recording control unit 174 and the display control unit 175 correspond to the recording reproduction unit of the DSP 170.

Example of Relationship Between Imaging Range and Captured Image

Figure 8A:
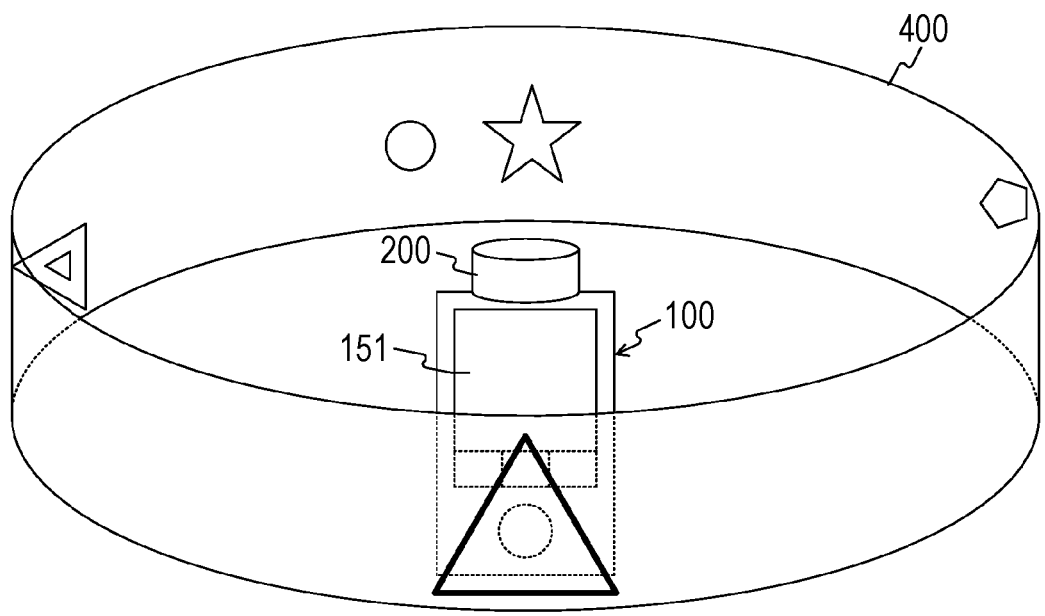
FIGS. 8A and 8B are diagrams of a simplified relationship between an imaging range as an imaging target of the imaging apparatus and a captured image generated by the imaging apparatus according to the first embodiment of the disclosure.
Figure 8B:
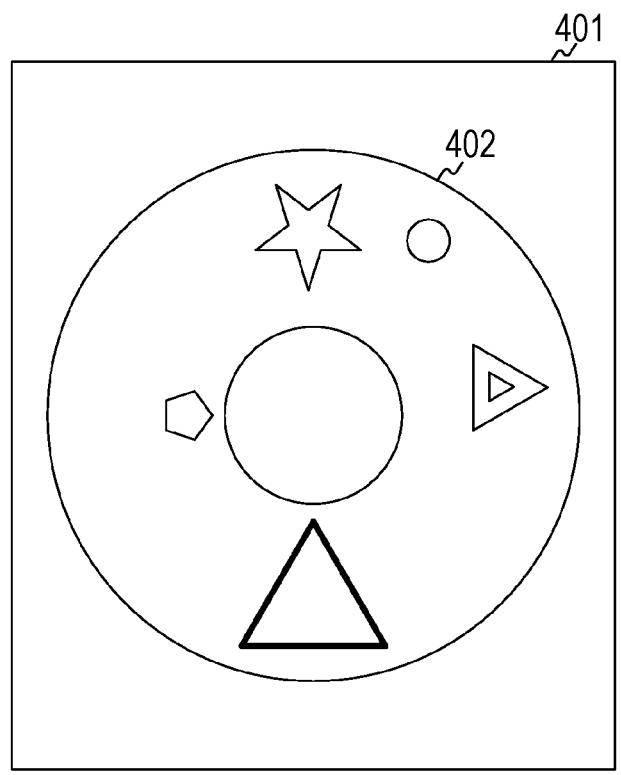

FIGS. 8A and 8B are diagrams of a relationship between an imaging range as an imaging target of the imaging apparatus 100 and a captured image generated by the imaging apparatus 100 according to the first embodiment of the disclosure.

FIG. 8A schematically shows an imaging range 400 when the omnidirectional imaging process is performed using the imaging apparatus 100 on which the adapter 200 is mounted. FIG. 8B schematically shows an omnidirectional image 402 (an annular image in a display screen 401) generated by the imaging apparatus 100 when the omnidirectional imaging process is performed in a state shown in FIG. 8A. To show the correspondence relationship in the imaging range 400 and the omnidirectional image 402, star, circle, triangle, and the like are disposed.

As shown in FIGS. 8A and 8B, the annular omnidirectional image 402 corresponding to the imaging range 400 is generated when the omnidirectional imaging process is performed using the imaging apparatus 100 on which the adapter 200 is mounted. In this case, in the input/output panel 151, the omnidirectional image 402 is disposed in the middle of a background image (for example, a black image), as shown in FIG. 8B.

Example of Process of Capturing Image

FIGS. 9A to 11B are diagrams of a relationship between the imaging process performed using the imaging apparatus 100 and the captured image generated through the imaging process according to the first embodiment of the disclosure.

Figure 9A:
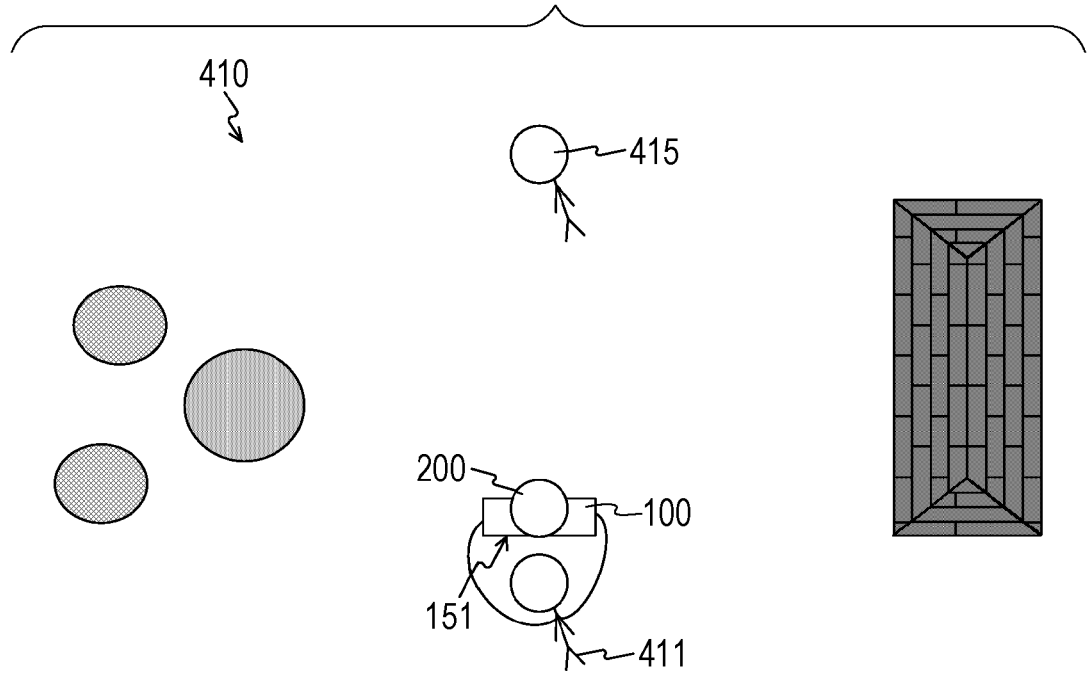
FIGS. 9A and 9B are diagrams of a relationship between an imaging process performed by the imaging apparatus and the captured image generated through the imaging process according to the first embodiment of the disclosure.
Figure 9B:
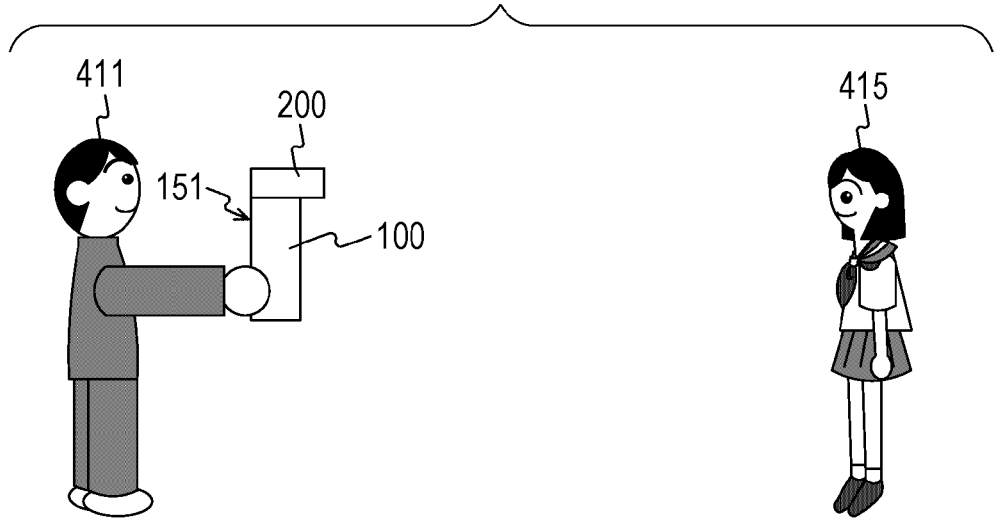

FIG. 9A is a top view when a place 410 as an imaging target is viewed from the upper side in the case where the omnidirectional image (annular image) is generated using the imaging apparatus 100. FIG. 9B shows a case where the imaging process performed in the state shown in FIG. 9A is viewed from the side. The place 410 is a location (where a house, trees, and the like are not illustrated in FIG. 9B) where a house, trees, and the like are present, which are simply shown in FIGS. 9A and 9B to facilitate the description. FIGS. 9A and 9B show an example of the imaging process when the adapter 200 is mounted on the imaging apparatus 100. In FIGS. 9A and 9B, a user operates the imaging apparatus 100 to execute the imaging process (omnidirectional imaging process) of the omnidirectional image (annular image), so that a person 415 is located in the front of a person (photographer) 411 holding the imaging apparatus 100 mounted with the adapter 200 with his or her hands.

Figure 10A:
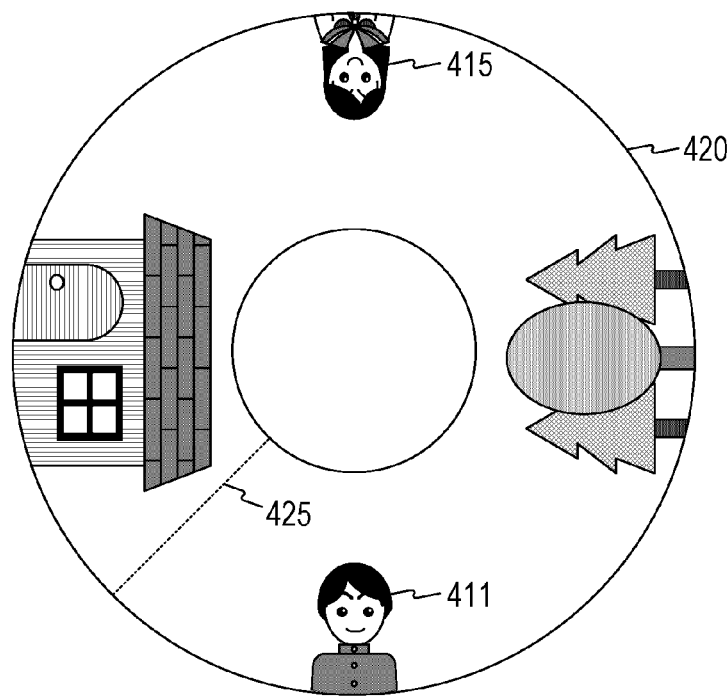
FIGS. 10A and 10B are diagrams of a relationship between the imaging process performed by the imaging apparatus and the captured image generated through the imaging process according to the first embodiment of the disclosure.

FIG. 10A shows the omnidirectional image 420 generated through the omnidirectional imaging process shown in FIGS. 9A and 9B. That is, the omnidirectional image 420 is an annular image in which the person 415 is disposed in the upper side and the person 411 is disposed in the lower side.

Figure 10B:
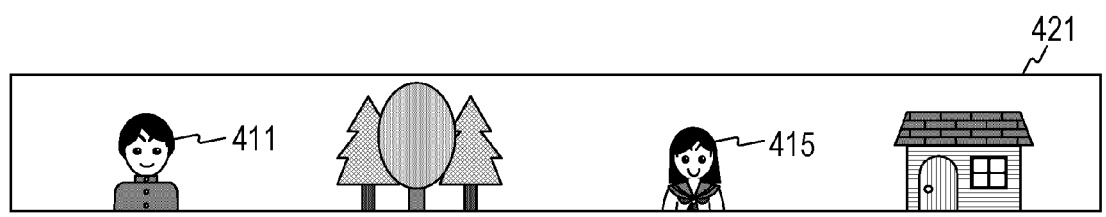

FIG. 10B shows a horizontally long image 421 formed by cutting the omnidirectional image 420 shown in FIG. 10A along a dotted line 425 in a radial direction and developing the cut omnidirectional image 420. That is, the horizontally long image 421 is a panorama image in which the person 411 and the person 415 are disposed at the positions corresponding to the omnidirectional image 420.

Figure 11A:
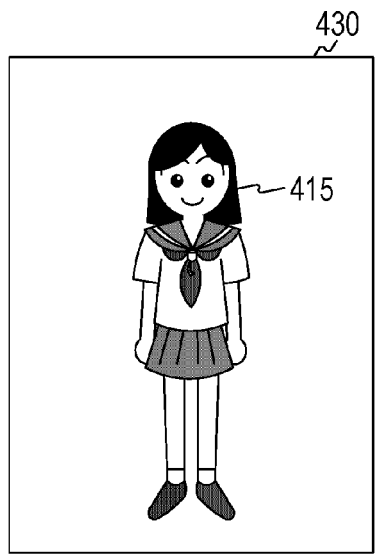
FIGS. 11A and 11B are diagrams of a relationship between the imaging process performed by the imaging apparatus and the captured image generated through the imaging process according to the first embodiment of the disclosure.

FIG. 11A is a plane image 430 generated when the adapter 200 is detached from the imaging apparatus 100 in the state of FIGS. 9A and 9B. That is, the plane image 430 is a vertically long image in which the person 415 is disposed in the middle. The plane image 430 is generated by the first imaging unit 110.

Figure 11B:
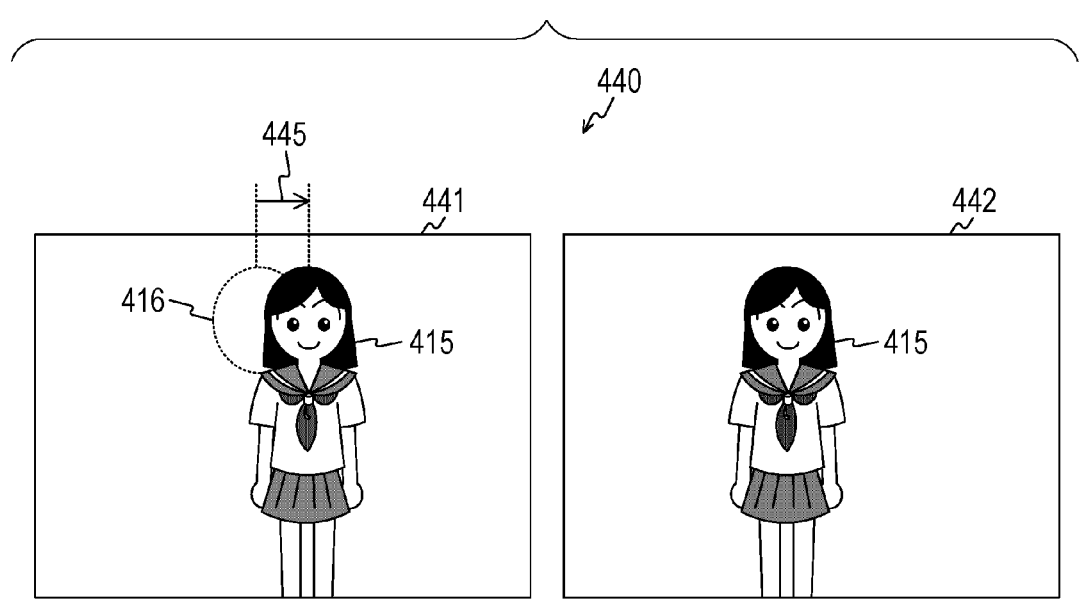

FIG. 11B shows a stereoscopic image 440 which is generated through the imaging process performed when the adapter 200 is detached from the imaging apparatus 100 and the imaging apparatus 100 is rotated by 90 degrees (the direction of the arrow 102 shown in FIG. 1A) at the position shown in FIGS. 9A and 9B so that the imaging apparatus 100 becomes a horizontally long state. That is, the stereoscopic image 440 is formed by a left-eye image 441 generated by the first imaging unit 110 and a right-eye image 442 generated by the second imaging unit 120. The left-eye image 441 and the right-eye image 442 are a pair of images for displaying a stereoscopic image. A subject (person 415) included in the imaging range is deviated in a horizontal direction (as indicated by an arrow 445). A dot-lined ellipse 416 indicates the contour of the face of the person 415 included in the right-eye image 442.

When the imaging process is performed using the imaging apparatus 100, the plural kinds of captured images can be recorded. For example, it is considered that the person 411 executes the imaging process to record the plural kinds of captured images by setting the person 415 as a main subject. For example, it is considered that the imaging process is performed to record the stereoscopic image 440 shown in FIG. 11B, and then the imaging process is performed to record the omnidirectional image 420 shown in FIG. 10A. In this case, the person 411 initially executes the imaging process (for example, a moving image capture process) by rotating the imaging apparatus 100 horizontally long without mounting the adapter 200 and setting the stereoscopic image capture mode. Then, the person 411 executes the imaging process (for example, a moving image capture process) by mounting the adapter 200, rotating the imaging apparatus 100 vertically long, and setting the omnidirectional image capture mode.

However, it is considered that the person 411 finishes the process of imaging the stereoscopic image, just mounts the adapter 200, and then starts the imaging process in a state where the person 411 forgets to set the omnidirectional image capture mode. Further, it is considered that after the person 411 mounts the adapter 200 and executes the omnidirectional imaging process, the person 411 forgets to detach the adapter 200, sets another image capture mode (for example, the stereoscopic image capture mode), and starts the imaging process. In this case, there is a concern that the captured image may not be appropriately recorded. Accordingly, in the first embodiment of the disclosure, the image capture mode is appropriately set when the adapter 200 is mounted.

Example of Notification when Adapter is Mounted

FIGS. 12 and 13 are diagrams of notification examples when the adapter 200 is mounted on the imaging apparatus 100 according to the first embodiment of the disclosure.

FIG. 12 shows a notification example when the adapter 200 is mounted on the imaging apparatus 100 in a state where the image capture mode (the plane image capture mode or the stereoscopic image capture mode) other than the omnidirectional image capture mode is set. When the adapter 200 is mounted on the imaging apparatus 100 in the state where the image capture mode other than the omnidirectional image capture mode is set, the control unit 173 cancels the image capture mode set when the adapter 200 is mounted and sets the omnidirectional image capture mode. In this case, the control unit 173 cancels the image capture mode set when the adapter 200 is mounted and gives a notification to set the omnidirectional image capture mode. For example, the input/output panel 151 displays a message in which "The omnidirectional image capture mode has been set since an adapter is mounted", as shown in FIG. 12.

FIG. 13 shows a notification example in a state where a setting operation is executed to set the image capture mode (the plane image capture mode or the stereoscopic image capture mode) other than the omnidirectional image capture mode when the adapter 200 is mounted on the imaging apparatus 100. In this way, in the state where the setting operation is executed to set the image capture mode other than the omnidirectional image capture mode when the adapter 200 is mounted on the imaging apparatus 100, the control unit 173 performs control to invalidate the setting operation. In this case, the control unit 173 gives a notification to invalidate the setting operation. For example, it is considered that the setting operation is executed to set the stereoscopic image capture mode when the adapter 200 is mounted on the imaging apparatus 100. In this case, the input/output panel 151 displays a message in which "The operation of setting the stereoscopic image capture mode is invalid since an adapter is mounted", as shown in FIG. 13.

In this way, in the first embodiment of the disclosure, in the state where the adapter 200 is mounted, the omnidirectional image capture mode is set even when the setting operation is not executed to set the omnidirectional image capture mode. When the user mounts the adapter 200 and executes the omnidirectional imaging process, and then forgets to detach the adapter 200 and executes the setting operation of another image capture mode (for example, the stereoscopic image capture mode), the setting operation is invalidated and the notification of the reason for invalidating the setting operation is given. Thus, the image capture mode can be appropriately set when the adapter 200 is mounted.

Example of Process of Imaging Apparatus

Next, a process of the imaging apparatus 100 will be described with reference to the drawings according to the first embodiment of the disclosure.

Figure 14:
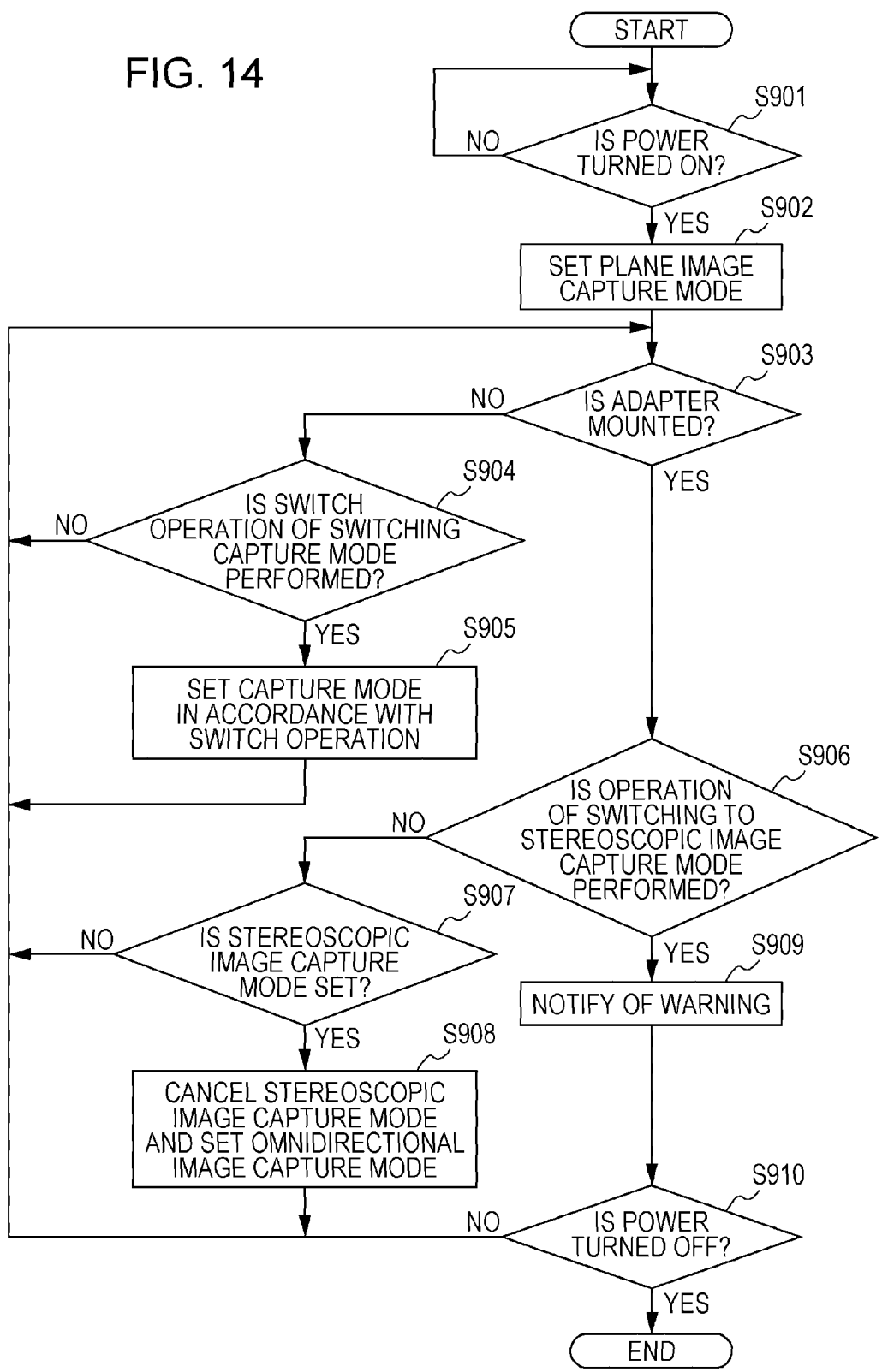
FIG. 14 is a flowchart of an example of a processing order of an image capture mode setting control process by the imaging apparatus according to the first embodiment of the disclosure.

FIG. 14 is a flowchart of an example of a processing order of an image capture mode setting control process performed by the imaging apparatus 100 according to the first embodiment of the disclosure. In this example, when the power of the imaging apparatus 100 is turned on, one image capture mode is set.

First, it is determined whether an operation of turning on power is executed (step S901). When the operation of turning on the power is not executed, monitoring continues. On the other hand, when the operation of turning on the power is executed (step S901), the control unit 173 allows the image capture mode setting unit 172 to set the plane image capture mode (2D image capture mode) (step S902).

Next, the control unit 173 determines whether the adapter 200 is mounted on the imaging apparatus 100 based on the detection result of the adapter mounting detection unit 131 (step S903). When the adapter 200 is not mounted on the imaging apparatus 100 (step S903), it is determined whether an operation (setting operation) of switching the image capture mode is executed (step S904). When the operation of switching the image capture mode is not executed, the process returns to step S903. On the other hand, when the operation of switching the image capture mode is executed (step S904), the image capture mode is set by the switching operation (step S905) and the process returns to step S903. Step S903 is an example of detecting whether an adapter is mounted according to still another embodiment of the disclosure. Further, step S905 is an example of setting the image capture mode according to still another embodiment of the disclosure.

When the adapter 200 is mounted on the imaging apparatus 100 (step S903), it is determined whether an operation (operation of setting the stereoscopic image capture mode) of switching to the stereoscopic image capture mode (3D image capture mode) is executed (step S906). When the operation of switching to the stereoscopic image capture mode is not executed (step S906), it is determined whether the stereoscopic image capture mode is set (step S907). When the stereoscopic image capture mode is not set, the process returns to step S903. On the other hand, when the stereoscopic image capture mode is set (step S907), the control unit 173 cancels the stereoscopic image capture mode and allows the image capture mode setting unit 172 to control the setting of the omnidirectional image capture mode (step S908), and then the process returns to step S903. In this case, for example, as shown in FIG. 12, the user is notified by the display of a message with the reason for setting the omnidirectional image capture mode on the input/output panel 151. Step S907 and step S908 are an example of controlling a process of cancelling the stereoscopic image capture mode according to still another embodiment of the disclosure.

When the operation of switching to the stereoscopic image capture mode is executed (step S906), the control unit 173 gives a warning notification to invalidate the switching operation (step S909). For example, as shown in FIG. 13, the user is notified by the display of a message with the reason for invalidating the operation of switching to the stereoscopic image capture mode on the input/output panel 151.

Next, it is determined whether an operation of turning off the power (step S910). When the operation of turning off the power is not executed, the process turns to step S903. On the other hand, when the operation of turning off the power is executed (step S910), the image capture mode setting control process ends.

In the first embodiment of the disclosure, the imaging apparatus (so-called two-lens 3D camera) including two imaging units has been exemplified. However, the first embodiment of the disclosure may be applied to an imaging apparatus (so-called single-lens 3D camera) including one imaging unit which generates a stereoscopic image.

2. Second Embodiment

In the first embodiment of the disclosure, the example has been described in which the omnidirectional image capture mode is set at the time of mounting the adapter 200 and the operation (setting operation) of switching to another image capture mode is invalidated when the operation of switching another image is executed at the time of mounting the adapter 200. Here, when the omnidirectional imaging process is performed by the imaging apparatus including two imaging units, an imaging process other than the omnidirectional imaging process can be performed using one imaging unit. Accordingly, in a second embodiment of the disclosure, an imaging process other than the omnidirectional imaging process is performed using one imaging unit when the omnidirectional imaging process is performed by the imaging apparatus including two imaging units. The configuration of the imaging apparatus according to the second embodiment of the disclosure is substantially the same as the configuration shown in FIGS. 1A to 7. Therefore, the same reference numerals are given to the same constituent elements as those of the first embodiment of the disclosure and the description thereof will not be partially repeated.

Figure 15:
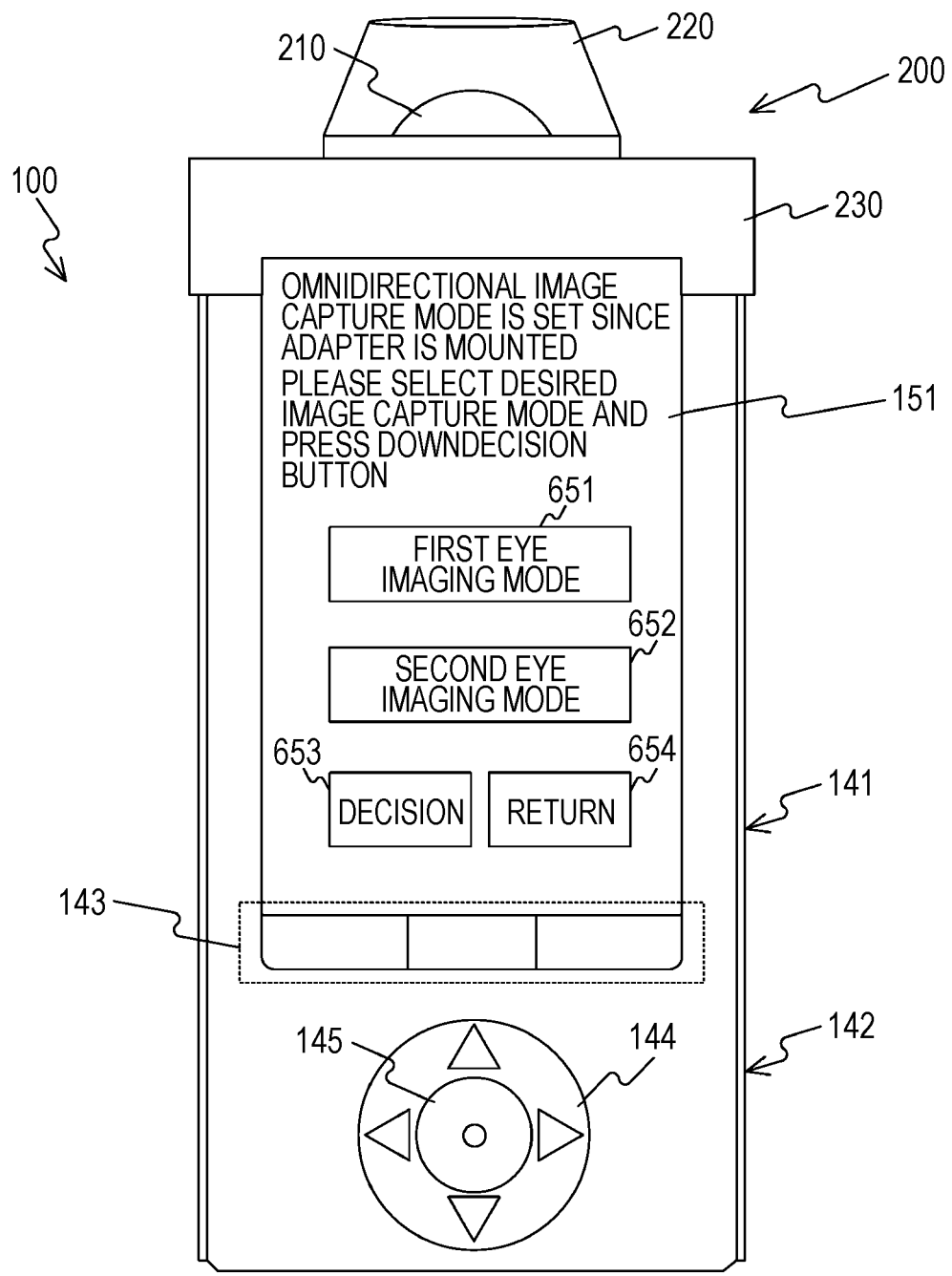
FIG. 15 is a diagram of an example of a display screen displayed on an input/output panel according to a second embodiment of the disclosure.

In the second embodiment of the disclosure, one of a single-lens image capture mode and a two-lens image capture mode is set as the omnidirectional image capture mode. That is, the image capture mode setting unit 172 sets one of the plane image capture mode, the stereoscopic image capture mode, the single-lens image capture mode, and the two-lens image capture mode based on a user operation. The single-lens image capture mode is an image capture mode of performing the omnidirectional image capture mode by the use of one imaging unit. Further, since the single-lens image capture mode is the same as the omnidirectional image capture mode of the first embodiment of the disclosure, the detailed description will not be made. The two-lens image capture mode is an image capture mode of performing an imaging process of imaging an omnidirectional image and a plane image by the use of two imaging units. That is, the two-lens image capture mode is a specific image capture mode of recording an omnidirectional image and a plane image by generating the omnidirectional image by the use of the first imaging unit 110 and generating the plane image by the use of the second imaging unit 120. Further, since the two-lens image capture mode is substantially the same as the omnidirectional image capture mode of the first embodiment of the disclosure except that a plane image is generated by another imaging unit other than the imaging unit generating an omnidirectional image. FIG. 15 shows an example of a display screen used to set the single-lens image capture mode and the two-lens image capture mode.

Setting Example of Single-Lens Image Capture Mode and Two-Lens Image Capture Mode FIG. 15 is a diagram of an example of a display screen displayed on the input/output panel 151 according to the second embodiment of the disclosure. The display screen shown in FIG. 15 is an example of a display screen used to set the single-lens image capture mode and the two-lens image capture mode and is displayed when the adapter 200 is mounted.

The display screen shown in FIG. 15 displays a single-lens image capture mode setting button 651, a two-lens image capture mode setting button 652, a confirmation button 653, and a return button 654.

The single-lens image capture mode setting button 651 is a button used to set the single-lens image capture mode as the omnidirectional image capture mode. The two-lens image capture mode setting button 652 is a button used to set the two-lens image capture mode as the omnidirectional image capture mode.

The confirmation button 653 is a button used to confirm an operation of pressing down the single-lens image capture mode setting button 651 or the two-lens image capture mode setting button 652 after this operation is executed.

The return button 654 is a button used to return the present screen to the immediately previous display screen.

In this example, the two-lens image capture mode is set through a manual operation, but may be set through an automatic operation. That is, in a case where the plane image capture mode or the stereoscopic image capture mode is set when the mounting of the adapter 200 is detected, the control unit 173 shown in FIG. 7 may cancel the set image capture mode and perform control to set the two-lens image capture mode. In this case, the control unit 173 performs control to record the omnidirectional image generated by the first imaging unit 110 and the plane image generated by the second imaging unit 120 in accordance with the same recording scheme as the recording scheme at the time of setting the stereoscopic image capture mode. An example of the recording will be described in detail with reference to FIGS. 18A and 18B.

Example of Captured Image in Setting Two-Lens Image Capture Mode

Figure 16A:
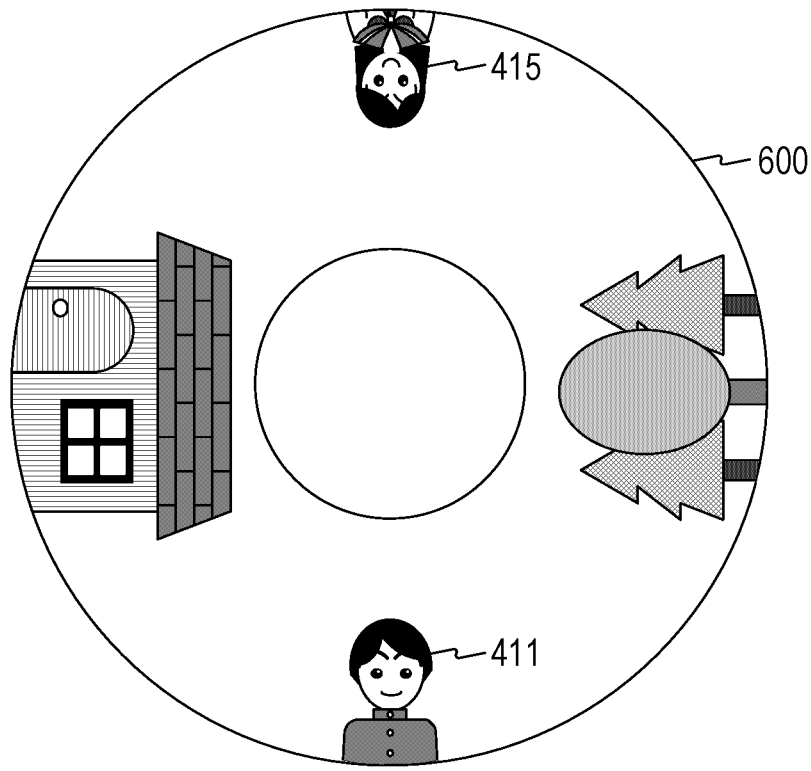
FIGS. 16A and 16B are diagrams of an example of a captured image generated by an imaging unit according to the second embodiment of the disclosure.
Figure 16B:
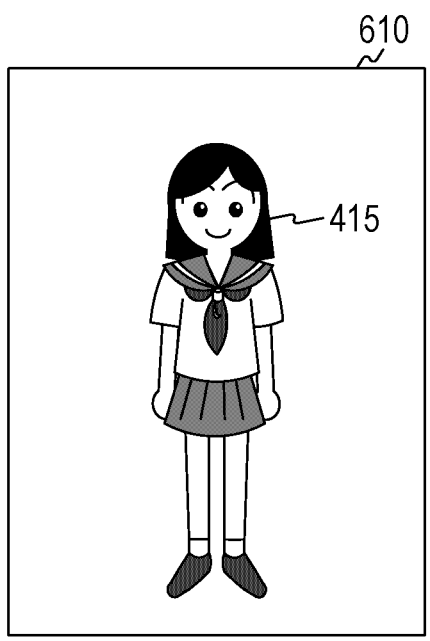

FIGS. 16A and 16B are diagrams of an example of a captured image generated by the imaging unit 105 according to the second embodiment of the disclosure. FIGS. 16A and 16B show an example of the captured image when the adapter 200 is mounted on the imaging apparatus 100 in the vertically long state at the position shown in FIGS. 9A and 9B and the two-lens image capture mode is set.

FIG. 16A shows an omnidirectional image 600 generated by the first imaging unit 110. The omnidirectional image 600 is the same as the omnidirectional image 420 shown in FIG. 10A.

FIG. 16B shows a plane image 610 generated by the second imaging unit 120. The plane image 610 is substantially the same as the plane image 430 shown in FIG. 11A except that the imaging unit (that is, the first imaging unit 110 generates the plane image in FIG. 11A) generating the plane image is different. That is, the captured image generated by the first imaging unit 110 are not completely the same as the captured image generated by the second imaging unit 120, since the captured images are deviated to some extent in the longitudinal direction of the imaging apparatus 100, as described above. In FIG. 16B, however, in order to facilitate the description, it is assumed that the plane image 610 is substantially the same as the plane image 430 shown in FIG. 11A.

As shown in FIGS. 16A and 16B, when the adapter 200 is mounted on the imaging unit 100 and the two-lens image capture mode is set, the omnidirectional image 600 and the plane image 610 captured by imaging a main subject (person 415) included in the omnidirectional image 600 can be simultaneously generated.

Display Example in Setting Two-Lens Image Capture Mode

Figure 17:
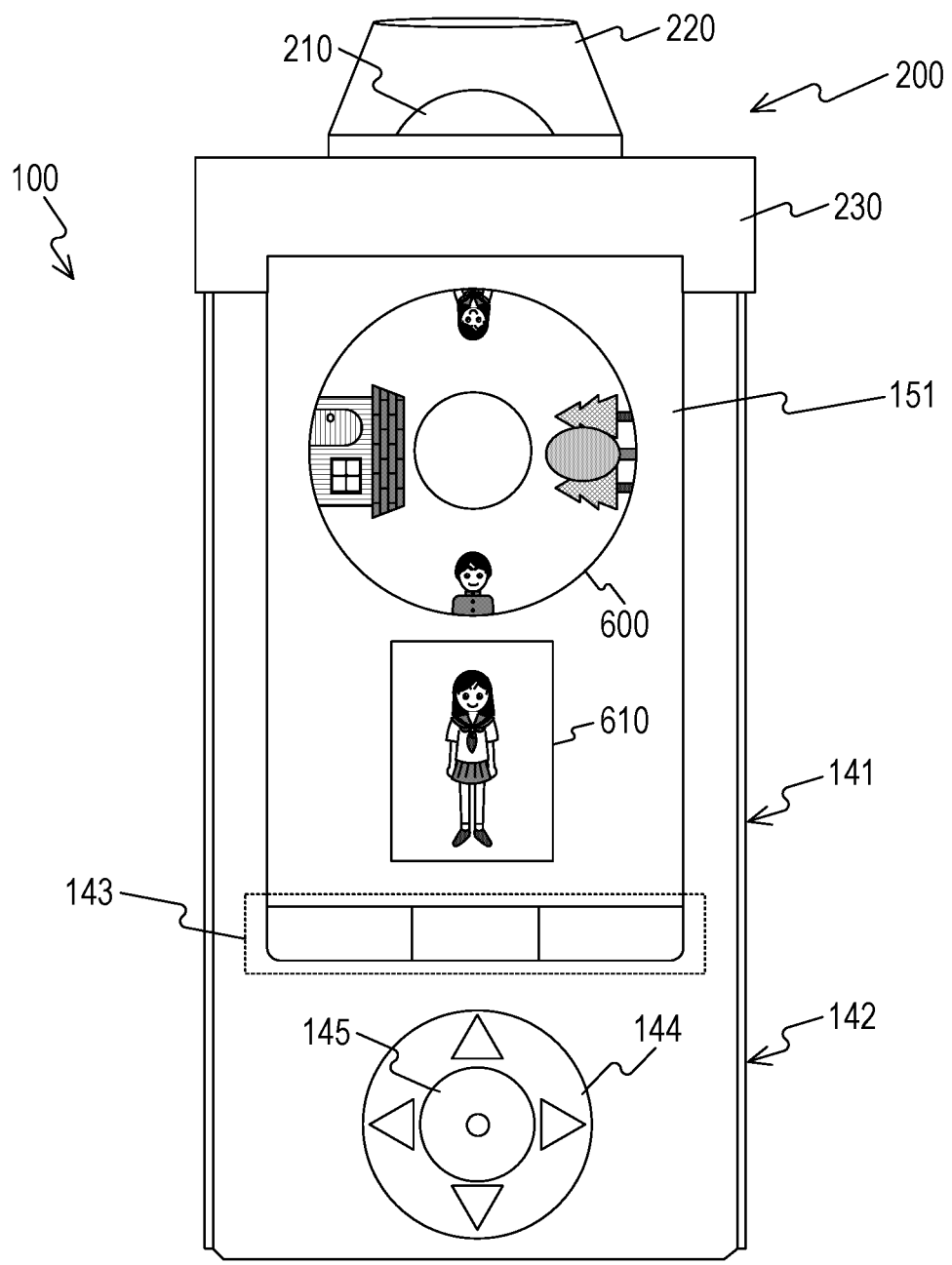
FIG. 17 is a diagram of a display example of a captured image displayed on the input/output panel according to the second embodiment of the disclosure.

FIG. 17 is a diagram of a display example of the captured image displayed on the input/output panel 151 according to the second embodiment of the disclosure. FIG. 17 shows an example in which the omnidirectional image 600 (generated by the first imaging unit 110) shown in FIG. 16A and the plane image 610 (generated by the second imaging unit 120) shown in FIG. 16B are simultaneously displayed on the input/output panel 151 at the imaging time. That is, FIG. 17 shows an example in which the omnidirectional image 600 and the plane image 610 are displayed as through images on the input/output panel 151.

A display form shown in FIG. 17 is just an example. The omnidirectional image 600 and the plane image 610 to be displayed may be displayed so as to be disposed differently. For example, the omnidirectional image 600 and the plane image 610 may be displayed vertically upside down. Further, the display form may be changed depending on a variation in the posture of the imaging apparatus 100.

Recording Example in Setting Two-Lens Image Capture Mode

Figure 18A:
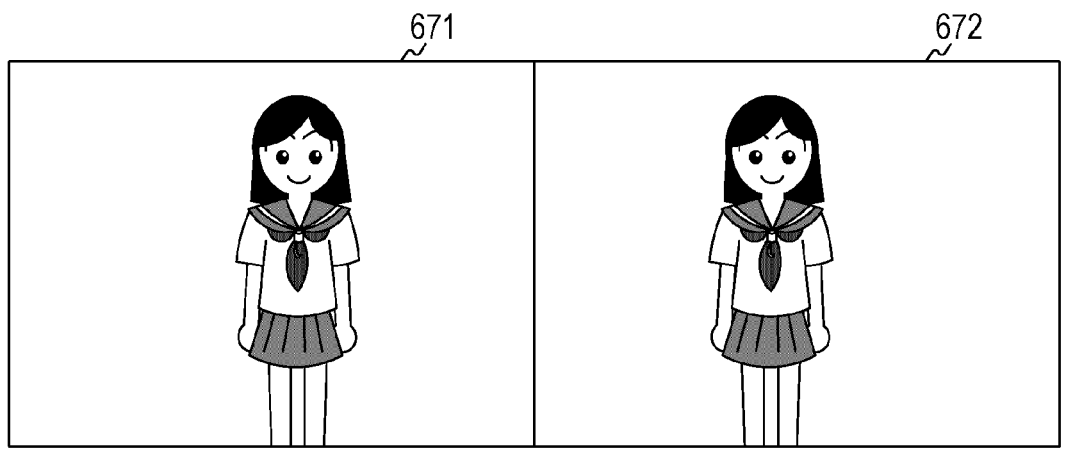
FIGS. 18A and 18B are diagrams of a recording example of a captured image recorded in a storage medium according to the second embodiment of the disclosure.
Figure 18B:
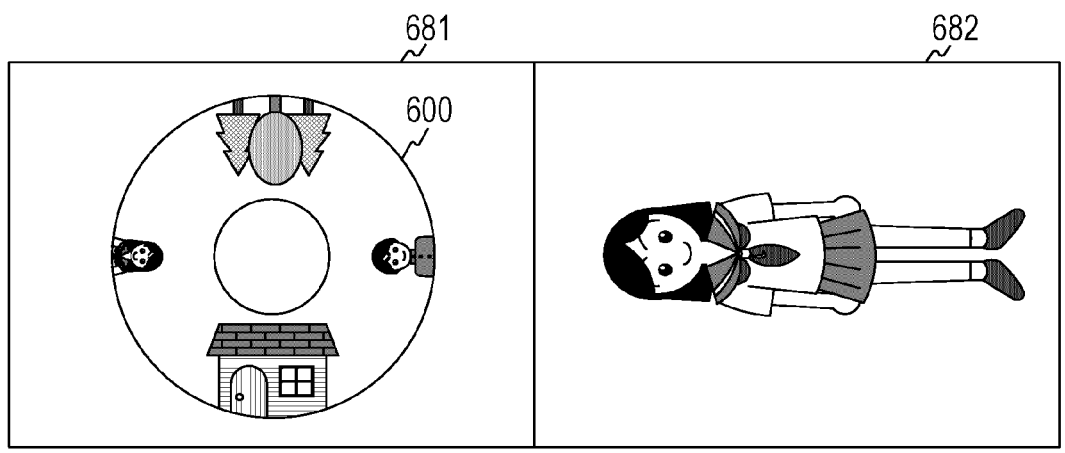

FIGS. 18A and 18B are diagrams of a recording example of a captured image to be recorded in the recording medium 185 according to the second embodiment of the disclosure. FIGS. 18A and 18B show an example in which the omnidirectional image 600 shown in FIG. 16A and the plane image 610 shown in FIG. 16B are recorded in association therewith. In this example, a case will be described in which two images generated by the first imaging unit 110 and the second imaging unit 120 are recorded as moving image content items (two moving image content items).

For example, an omnidirectional image and a plane image can be recorded in accordance with the same recording scheme as the recording scheme (recording format) at the time of recording a stereoscopic image. For example, a side-by-side scheme, in which a right-eye image and a left-eye image are arranged on the right and left sides in one frame, can be used.

FIG. 18A schematically shows a recording example in which a stereoscopic image is recorded in accordance with the side-by-side scheme. As shown in FIG. 18A, a left-eye image 671 and a right-eye image 672 are arranged and recorded on the left and right side in one frame when the side-by-side scheme is used. Further, the left-eye image 671 and the right-eye image 672 correspond to the left-eye image 441 and the right-eye image 442 shown in FIG. 11A, respectively.

FIG. 18B schematically shows a recording example when the omnidirectional image 600 and the plane image 610 shown in FIGS. 16A and 16B are recorded in accordance with the side-by-side scheme. As shown in FIG. 18B, for example, an omnidirectional image 681 is recorded instead of the left-eye image and a plane image 682 is recorded instead of the right-eye image when the side-by-side scheme is used. In this case, as in the recording of the stereoscopic image, the lines in the vertical direction in the omnidirectional image 600 and the plane image 610 shown in FIGS. 16A and 16B are thinned and recorded. In the moving image content item recorded in this way, a reason for recording the omnidirectional image and the plane image may be included in incidental information.

When the moving image content item recorded in this way is reproduced, the reason for recording the omnidirectional image and the plane image can be determined based on the incidental information. In this case, the images are reproduced in accordance with a reproduction method different from the reproduction method used when the stereoscopic image is displayed. For example, instead of alternately displaying the omnidirectional image and the plane image, the omnidirectional image and the plane image can be simultaneously displayed on the same screen. For example, the images can be displayed as in the display example shown in FIG. 17. In the moving image content item recorded in accordance with the side-by-side scheme, the lines in the vertical direction are thinned and recorded, as described above. Therefore, when the moving image content item recorded in accordance with the side-by-side scheme is reproduced, the images can be displayed after an interpolation process or the like is performed on the thinned lines.

For example, the omnidirectional image and the plane image may be recorded in accordance with a recording scheme different from the recording scheme of recording the stereoscopic image. For example, the omnidirectional image and the plane image may be recorded as different files. In this case, time information, synchronization information (information used to display the omnidirectional image and the plane image in synchronization therewith), and the like are included as the incidental information of each file so that the omnidirectional image and the plane image can be simultaneously displayed on the same screen, as described above.

In the second embodiment of the disclosure, the two-lens image capture mode can be set when the adapter 200 is mounted. In this case, the omnidirectional image and the plane image can be simultaneously recorded as the moving image content items. Therefore, when the moving image content items are reproduced, a user can simultaneously display and view the omnidirectional image and the plane image. The display state of the omnidirectional image and the plane image can be switched and viewed in sequence. Thus, according to the second embodiment of the disclosure, the image capture mode can be appropriately set when the adapter 200 is mounted. When the recorded content item is reproduced in the two-lens image capture mode, the display form can be viewed in accordance with the preference of the user.

The embodiments of the disclosure may be applied to imaging apparatuses such as mobile phones, navigation systems, or portable media players including an imaging unit capable of generating a stereoscopic image.

In the embodiments of the disclosure, the example has been described in which the annular image is generated and recorded as an omnidirectional image. However, when a circular image is generated and recorded as an omnidirectional image, the embodiments of the disclosure may be applied.

The embodiments of the disclosure are just examples for realizing the disclosure. As clarified in the embodiments of the disclosure, the units or the steps described in the embodiments of the disclosure correspond to the units or the steps described in the claims. Likewise, the same names of the units or the steps of the embodiments of the disclosure as those of the units and the steps described in the claims have the correspondence relationship. However, embodiments of the disclosure are not limited to the above-described embodiments of the disclosure, but may be realized by various modifications of the embodiments within the scope of the disclosure without departing from the gist of the disclosure.

The processing order described in the embodiments of the disclosure may be regarded as a method including the series of orders and may be regarded as a program causing a computer to execute the series of orders or a recording medium storing the program. Examples of the recording medium include a CD (Compact Disc), an MD (Mini Disc), a DVD (Digital Versatile Disc), a memory card, and a Blu-ray disc (registered trademark).

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an imaging unit which generates a plane image including a subject by imaging the subject in a specific direction or a stereoscopic image for stereoscopically viewing the subject; and
   circuitry which (i) detects whether an adapter, which includes an omnidirectional imaging optical system imaging the subject in all directions, is mounted on the imaging unit, (ii) sets, based on a user operation, an omnidirectional image capture mode of recording the plane image including the subject in all directions in a state where the adapter is mounted on the imaging unit or a stereoscopic image capture mode of recording the stereoscopic image, and (iii) performs control to cancel the stereoscopic image capture mode and set the omnidirectional image capture mode in a case where the stereoscopic image capture mode is set when the mounting of the adapter is detected,
   wherein the circuitry performs control to invalidate a setting operation of setting the stereoscopic image capture mode when the setting operation is executed as the user operation in the state where the mounting of the adapter is detected.

2. The imaging apparatus according to claim 1, wherein the circuitry performs control to give a notification to invalidate the setting operation when the setting operation is executed.

3. An imaging apparatus comprising:
   an imaging unit which generates a plane image including a subject by imaging the subject in a specific direction or a stereoscopic image for stereoscopically viewing the subject; and
   circuitry which (i) detects whether an adapter, which includes an omnidirectional imaging optical system imaging the subject in all directions, is mounted on the imaging unit, (ii) sets, based on a user operation, an omnidirectional image capture mode of recording the plane image including the subject in all directions in a state where the adapter is mounted on the imaging unit or a stereoscopic image capture mode of recording the stereoscopic image, and (iii) performs control to cancel the stereoscopic image capture mode and set the omnidirectional image capture mode in a case where the stereoscopic image capture mode is set when the mounting of the adapter is detected,
   wherein the imaging unit includes
      a first imaging unit generating a first image for displaying the stereoscopic image and
      a second imaging unit generating a second image for displaying the stereoscopic image, and wherein the first imaging unit generates the plane image including the subject in all directions, when the adapter is mounted on only the first imaging unit and the omnidirectional image capture mode is set.

4. An imaging apparatus comprising:
an imaging unit which generates a plane image including a subject by imaging the subject in a specific direction or a stereoscopic image for stereoscopically viewing the subject; and
circuitry which (i) detects whether an adapter, which includes an omnidirectional imaging optical system imaging the subject in all directions, is mounted on the imaging unit, (ii) sets, based on a user operation, an omnidirectional image capture mode of recording the plane image including the subject in all directions in a state where the adapter is mounted on the imaging unit or a stereoscopic image capture mode of recording the stereoscopic image, and (iii) performs control to invalidate a setting operation of setting the stereoscopic image capture mode when the setting operation is executed as the user operation in the state where the mounting of the adapter is detected.

5. The imaging apparatus according to claim 1, wherein the imaging unit includes a first imaging unit generating a first image for displaying the stereoscopic image and a second imaging unit generating a second image for displaying the stereoscopic image.

6. The imaging apparatus according to claim 1, wherein the plane image including the subject in all directions is a circular image.

7. The imaging apparatus according to claim 1, wherein the plane image including the subject in all directions is an annular image.

8. The imaging apparatus according to claim 1, wherein the circuitry sets one of the omnidirectional image capture mode, the stereoscopic image capture mode, or a plane image capture mode of recording a plane image including the subject in the specific direction based on the user operation.

9. The imaging apparatus according to claim 3, wherein the plane image including the subject in all directions is a circular image.

10. The imaging apparatus according to claim 3, wherein the plane image including the subject in all directions is an annular image.

11. The imaging apparatus according to claim 3, wherein the circuitry sets one of the omnidirectional image capture mode, the stereoscopic image capture mode, or a plane image capture mode of recording a plane image including the subject in the specific direction based on the user operation.

12. The imaging apparatus according to claim 4, wherein the imaging unit includes a first imaging unit generating a first image for displaying the stereoscopic image and a second imaging unit generating a second image for displaying the stereoscopic image.

13. The imaging apparatus according to claim 4, wherein the plane image including the subject in all directions is a circular image.

14. The imaging apparatus according to claim 4, wherein the plane image including the subject in all directions is an annular image.

15. The imaging apparatus according to claim 4, wherein the circuitry sets one of the omnidirectional image capture mode, the stereoscopic image capture mode, or a plane image capture mode of recording a plane image including the subject in the specific direction based on the user operation.

16. The imaging apparatus according to claim 4, wherein the circuitry performs control to give a notification to invalidate the setting operation when the setting operation is executed.

* * * * *